June 30, 1931. H. L. BONE 1,812,193
RAILWAY BRAKING APPARATUS
Filed Aug. 21, 1930 7 Sheets-Sheet 1

INVENTOR:
H. L. Bone,
by A. L. Vennell
His Attorney

June 30, 1931.  H. L. BONE  1,812,193
RAILWAY BRAKING APPARATUS
Filed Aug. 21, 1930  7 Sheets-Sheet 3

INVENTOR:
H. L. Bone,
by his Attorney

June 30, 1931.    H. L. BONE    1,812,193
RAILWAY BRAKING APPARATUS
Filed Aug. 21, 1930    7 Sheets-Sheet 6

Patented June 30, 1931

1,812,193

UNITED STATES PATENT OFFICE

HERBERT L. BONE, OF SWISSVALE, PENNSYLVANIA, ASSIGNOR TO THE UNION SWITCH & SIGNAL COMPANY, OF SWISSVALE, PENNSYLVANIA, A CORPORATION OF PENNSYLVANIA

RAILWAY BRAKING APPARATUS

Application filed August 21, 1930. Serial No. 476,862.

My invention relates to railway braking apparatus, and particularly to braking apparatus of the type comprising a braking bar located in the trackway and actuated by a fluid pressure motor controlled from a remote point.

I will describe several forms of railway braking apparatus embodying my invention, and will then point out the novel features thereof in claims.

Figure 1:
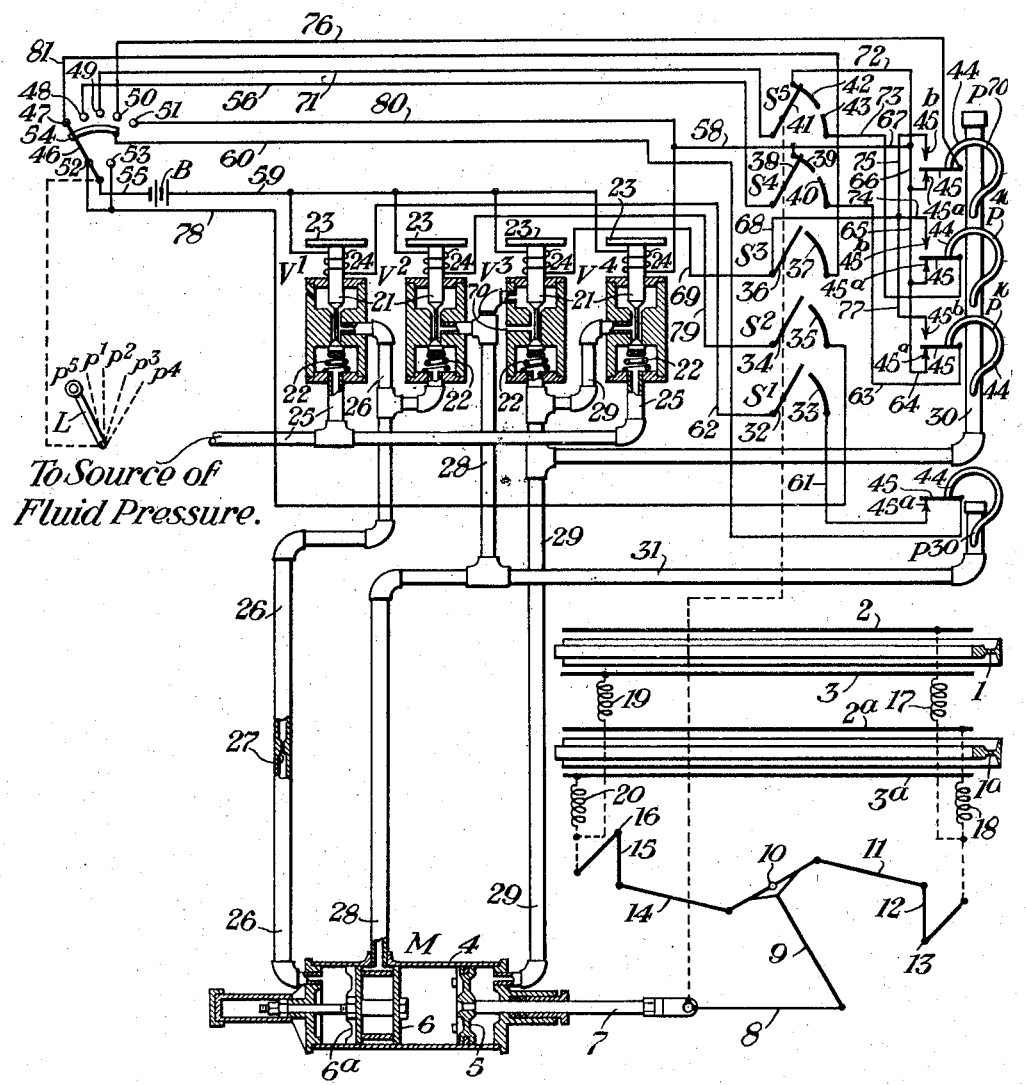

In the accompanying drawings, Fig. 1 is a view, partly diagrammatic, illustrating one form of railway braking apparatus operated by a fluid pressure motor controlled from a remote point in accordance with my invention. Figs. 2–13, inclusive, are similar views showing modified forms of the apparatus illustrated in Fig. 1, and also embodying my invention.

Similar reference characters refer to similar parts in all of the views.

Referring first to Fig. 1, the reference characters 1 and $1^a$ designate the track rails of a stretch of railway track. Located on opposite sides of rail 1 and extending parallel therewith are two braking bars 2 and 3. Two similar braking bars $2^a$ and $3^a$ extend parallel with rail $1^a$ on opposite sides thereof.

The braking bars 2, 3, $2^a$ and $3^a$ are operated by a fluid pressure motor M, which in the form here shown, comprises a cylinder 4 containing an auxiliary piston 6 which is movable between the left hand end of the cylinder and an intermediate point in the cylinder, and a main piston 5 which is movable between the right hand end of the cylinder and the auxiliary piston 6. It will be plain, therefore, that when the auxiliary piston 6 occupies its projected position, in which it is illustrated in the drawings, the stroke of the main piston 5 is less than when the auxiliary piston 6 occupies its retracted position. The sealing ring of the auxiliary piston 6 is located at $6^a$ in the drawings, and the parts are so proportioned that even when the auxiliary piston occupies its projected position, it does not blank a pipe 28 which communicates with the side of the cylinder 4. Piston 6 is provided with flutes by means of which the pipe 28 may at all times communicate with the region between the pistons 5 and 6. The main piston 5 of motor M is attached to a piston rod 7, which piston rod, in turn, is operatively connected with the braking bars 2, 3, $2^a$ and $3^a$ by means of suitable operating mechanism, one form of which I will now describe.

As here shown, this operating mechanism comprises a link 8 which is connected at one end to the free end of the piston rod 7, and at the other end to a lever 9 which is pivotally supported in the trackway at 10. One end of the lever 9 is connected, through a link 11, with a crank 12 which is pivotally supported in the trackway at 13, and the other end of lever 9 is connected, through a link 14, with a lever 15 which is pivotally supported in the trackway at 16. It will be seen, therefore, that the links 11 and 14 and the crank 9 constitute a toggle by means of which the cranks 12 and 15 may be swung in the same directions when the main piston 5 of motor M is operated. The free end of crank 12 is operatively connected with the braking bars 2 and $2^a$, respectively, by means of resilient connections which include springs 17 and 18, and, similarly, the free end of the crank 15 is operatively connected with the braking bars 3 and $3^a$ by means of resilient connections which include springs 19 and 20. It will be seen, therefore, that when piston 5 moves toward the left, the cranks 12 and 15 are both swung in a clockwise direction, so that each braking bar is moved toward the associated rail into a braking position in which it engages the side of a wheel of a railway car traversing the rails 1 and $1^a$. When the piston 5 moves toward the right, however, the cranks 12 and 15 are then swung in a counter-clockwise direction, and the braking bars are moved away from the associated rails to their non-braking positions, in which they are out of engagement with the wheels of a passing car. One form of operating mechanism of the type described is disclosed and claimed in my copending application for Letters Patent of the United States, Serial No. 307,895, filed on September 24, 1928, for Railway braking apparatus.

The motor M is controlled by four magnet valves $V^1$, $V^2$, $V^3$ and $V^4$. As here shown, each valve V comprises a valve stem 21, biased to an upper position by a spring 22, and provided with an armature 23 and a winding 24. When valve $V^1$ is energized, valve stem 21 of this valve moves downwardly against the bias exerted by spring 22, and a pipe 26, which communicates with the region of cylinder 4 between the auxiliary piston 6 and the adjacent end of the cylinder, is then connected with a pipe 25 which is constantly supplied with fluid pressure, usually air, from a suitable source not shown in the drawings. When valve $V^1$ is deenergized, however, valve stem 21 is moved upwardly by spring 22, and pipe 26 is then disconnected from pipe 25. When valve $V^2$ is energized, valve stem 21 of this valve moves downwardly, thereby connecting pipe 26 with pipe 28, but when valve $V^2$ is deenergized, pipe 26 is disconnected from pipe 28. When valve $V^3$ is energized, pipe 29 which communicates with the region of cylinder 4 between the main piston 5 and the adjacent end of the cylinder is vented to atmosphere through port 70, but when valve $V^3$ is deenergized, pipe 29 is disconnected from atmosphere, and pipe 28 which is disconnected from port 70 when this valve is energized, is then connected with port 70. When valve $V^4$ is energized, valve stem 21 of this valve moves downwardly and connects pipe 29 with pipe 25, but when valve $V^4$ is deenergized, pipe 29 is disconnected from pipe 25. It will be apparent, therefore, that when valve $V^1$ is energized and valve $V^2$ is deenergized, the region in cylinder 4 between the auxiliary piston 6 and the left-hand end of the cylinder is supplied with fluid pressure; when valves $V^1$, $V^2$ and $V^3$ are all energized, the regions in cylinder 4 between the pistons 5 and 6, and between the auxiliary piston 6 and the left-hand end of the cylinder, are both supplied with fluid pressure; and when valve $V^3$ is deenergized and valve $V^4$ is energized, the region in cylinder 4 between piston 5 and the right-hand end of the cylinder is supplied with fluid pressure. Furthermore, when valves $V^1$ and $V^3$ are deenergized and valve $V^2$ is energized, the region between the auxiliary piston 6 and the left-hand end of the cylinder is vented to atmosphere; when valve $V^3$ is deenergized, the region in cylinder 4 between the pistons 5 and 6 is vented to atmosphere; and when valve $V^3$ is energized, the region in cylinder 4 between piston 5 and the right hand end of the cylinder is vented to atmosphere.

It will be noted that the pipe 26 which communicates with the cylinder 4 between the auxiliary piston 6 and the left hand end of the cylinder is provided with a throttling restriction 27. The function of this restriction will be explained in detail hereinafter.

The valves $V^1$, $V^2$, $V^3$ and $V^4$ are controlled in part by a plurality of circuit controllers which are operated in accordance with the position of piston 5. As shown in Fig. 1, there are five of these circuit controllers designated by the reference characters $S^1$, $S^2$, $S^3$, $S^4$ and $S^5$, respectively. When the piston 5 occupies its extreme right hand position, in which it is shown in the drawings, so that the braking bars are in their open or ineffective positions, contact 38—39 of circuit controller $S^4$ and contact 41—42 of circuit controller $S^5$ are closed. As soon as piston 5 starts to move toward the left, contact 36—37 of circuit controller $S^3$ becomes closed, and upon a little further movement of piston 5 toward the left, contact 32—33 of circuit controller $S^1$ and contact 34—35 of circuit controller $S^2$ becomes closed. When piston 5 has moved to the left far enough so that the braking bars just engage the wheels of a car in the braking apparatus, contact 38—39 of circuit controller $S^4$ opens, and upon slight additional movement of piston 5 toward the left contact 41—42 of circuit controller $S^5$ opens, and contact 38—40 of circuit controller $S^4$ becomes closed. Furthermore, just before piston 5 reaches the end of its stroke in this direction, contact 41—43 of circuit controller $S^5$ becomes closed.

The valves V are also controlled in part by a plurality of pressure responsive devices, each designated by the reference character P with a distinguishing exponent. Referring to the pressure responsive device $P^{30}$ for example, this device comprises a Bourdon tube 44 connected, by means of a pipe 31, with pipe 28, and subjected to the pressure in the region between the pistons 5 and 6 in cylinder 4. The Bourdon tube 44 controls a contact 45—45$^a$ which is closed at all times except when the pressure exceeds a predetermined value, which is just sufficient to move the braking apparatus to its open position. For example, this pressure might be 30 pounds per square inch. The pressure responsive devices $P^{10}$, $P^{40}$ and $P^{70}$ are similar to the pressure responsive device $P^{30}$, except that the Bourdon tubes 44 of these devices are connected, through pipe 30, with pipe 29 which communicates with cylinder 4 between the main piston 5 and the right hand end of the cylinder. The devices $P^{10}$, $P^{40}$ and $P^{70}$ are arranged to operate in succession as the pressure in the right hand end of cylinder 4 increases. For example, for all pressure below 10 pounds per square inch, contact 45—45$^a$ of each of these devices is closed. If the pressure exceeds 10 pounds per square inch, however, contact 45—45$^a$ of device $P^{10}$ opens, and if the pressure exceeds 20 pounds per square inch, contact 45—45$^b$ of device $P^{10}$ closes. In similar manner, the pressure responsive devices $P^{40}$ and $P^{70}$ are adjusted to open their contacts 45—45$^a$ at 40 and 70 pounds per square inch, respectively, and to close their contacts 45—45$^b$ at 50 and 80 pounds per square inch. Of course these specific pressures are not essential, but are only mentioned for purposes of explanation.

The valves V are further controlled by means of a manually operable lever L which, as here shown, is capable of assuming five positions, indicated by the dotted lines in the drawings, and designated by the reference characters $p^1$ to $p^5$, inclusive. The lever L operates a contact arm 46 which is adapted to engage a selected one or ones of a plurality of fixed contacts designated by the reference characters 47 to 53, inclusive. The lever L is also provided with a segment contact 54 so disposed that when the contact arm 46 engages any one of the fixed contacts 47, 48, 49, 50 and 52, the contact arm also engages the segment contact 54, but that the contact arm 46 does not engage the segment contact 54 when it engages fixed contacts 51 and 53.

The lever L will usually be located at a point remote from the braking apparatus, as in the control cabin of a classification yard car retarder system, and will be connected with the braking apparatus by means of line wires extending from the control cabin to the braking apparatus.

As shown in the drawings, lever L occupies its $p^5$ or "off" position, in which contacts 46—47, 46—52 and 46—54 of lever L are all closed, but all of the valves V are deenergized. The supply of fluid pressure to all regions of cylinder 4 is therefore cut off, and the region between the main piston 5 and the auxiliary piston 6 is vented to atmosphere. The contacts 45—45$^a$ of the pressure responsive devices P are all closed and the contacts 45—45$^b$ are all open. Piston 5 of motor M occupies its extreme right hand position in cylinder 4, and the braking bars therefore occupy their retracted or ineffective positions. Contact 32—33 of circuit controller $S^1$, contact 34—35 of circuit controller $S^2$, contact 36—37 of circuit controller $S^3$, contact 38—40 of circuit controller $S^4$, and contact 41—43 of circuit controller $S^5$ are therefore all open, and contact 38—39 of circuit controller $S^4$, and contact 41—42 of circuit controller $S^5$ are closed. The auxiliary piston 6 of motor M occupies its projected position.

In explaining the operation of the apparatus, I will first assume that the operator wishes to make a comparatively light brake application. To do this, he moves lever L to its $p^1$ position, thereby closing contact 46—48. A circuit is then completed for valve $V^4$ and current flows from a suitable source such as a battery B through wire 55, contact 46—48 of lever L, line wire 56, contact 38—39 of circuit controller $S^4$, wire 58, winding 24 of valve $V^4$, and live wire 59 back to battery B. Valve $V^4$ therefore becomes energized and connects pipe 29 with pipe 25, so that fluid pressure is now supplied to cylinder 4 between piston 5 and the right hand end of the cylinder. This pressure drives piston 5 toward the left, thereby moving the braking bars toward their braking positions. It should be noted that the pressure available to commence the movement of the braking bars may be built up to full line pressure which may be of the order of 100 pounds per square inch, so that the response of the apparatus is very rapid. Shortly after piston 5 starts to move toward the left, contact 32—33 of circuit controller $S^1$ becomes closed, and a circuit is then completed for valve $V^1$ which passes from battery B through wire 55, contact 46—54 of lever L, line wire 60, contact 45—45$^a$ of pressure responsive device $P^{30}$, wire 61, contact 32—33 of circuit controller $S^1$, wire 62, winding 24 of valve $V^1$, and line wire 59 back to battery B. Valve $V^1$ therefore also becomes energized and connects pipe 26 with pipe 25. When pipe 26 is connected with pipe 25, full line pressure is supplied to cylinder 4 between the auxiliary piston 6 and the left hand end of the cylinder but, due to the throttling restriction 27 in the pipe 26, the rate at which this pressure can build up in the cylinder is limited to a value which precludes any possibility of shock to the piston 6 in case this piston does not occupy its full projected position for any reason at the time valve $V^1$ becomes energized. When this pressure has once built up, it holds the auxiliary piston in its projected position, thereby limiting the stroke of the main piston 5, as will be pointed out more fully hereinafter. When the main piston 5 has moved to the left far enough so that the braking bars are in a position corresponding to the working range of the apparatus, that is to say, when the braking bars are in position to engage the wheels of a car in the braking apparatus, contact 38—39 of circuit controller $S^4$ opens and interrupts the circuit previously traced for valve $V^4$. Valve $V^4$ therefore becomes deenergized and cuts off the supply of fluid pressure to the right hand end of cylinder 4. However, the fluid which has already been admitted to the right hand end of cylinder 4 now expands, and piston 5 therefore continues to move toward the left a sufficient distance to close contact 38—40 of circuit controller $S^4$. When contact 38—40 is closed, if the pressure in cylinder 4 between piston 5 and the right hand end of the cylinder is below 10 pounds per square inch, a branch for the circuit previously traced for valve $V^4$ will be completed, which branch may be traced from line wire 56, through contact 38—40 of circuit controller $S^4$, wire 63, contact 45—45$^a$ of pressure responsive device $P^{10}$, and wires 64, 65, 66 and 67 to wire 58. Under these conditions, therefore, valve $V^4$ will again become energized until the pressure in the right hand end of cylinder 4 exceeds 10 pounds per square inch, at which time contact 45—45ᵃ of pressure responsive device P¹⁰ will open and interrupt this branch, so that valve V⁴ will again become deenergized. It usually happens, however, that during the preliminary movement of piston 5, the pressure in the right hand end of cylinder 4 exceeds 20 pounds per square inch so that contact 45—45ᵇ of pressure responsive device P¹⁰ is closed. Under these conditions, when piston 5 reaches the position at which contact 38—40 of circuit controller S⁴ becomes closed, a circuit is completed for valve V³ which may be traced from battery B, through wire 55, contact 46—48 of lever L, line wire 56, contact 38—40 of circuit controller S⁴, wire 63, contact 45—45ᵇ of pressure responsive device P¹⁰, wires 77, 68, and 69, winding 24 of valve V³, and line wire 59 back to battery B. Valve V³ therefore becomes energized and connects pipe 29 with port 70. The right hand end of cylinder 4 is then exhausted to atmosphere until the pressure in this end of the cylinder has been reduced below 20 pounds per square inch, whereupon contact 45—45ᵇ of pressure responsive device P¹⁰ opens and deenergizes valve V³. It will be apparent, therefore, from the foregoing that, when lever L occupies its $p^1$ position, piston 5 is urged toward the left by a pressure of between 10 and 20 pounds per square inch. The movement of piston 5 toward the left under these conditions is limited by the auxiliary piston 6, which as pointed out hereinbefore, is held in its projected position by fluid pressure which is admitted to the left hand end of cylinder 4 as soon as contact 32—33 of circuit controller S¹ becomes closed, and the parts are so proportioned that the movement of lever 9 caused by this movement of piston 5 does not bring the toggle of which lever 9 forms a part to its dead-center position. It follows therefore, that if a car enters the braking apparatus, the braking bars may be forced away from the rails, thereby transmitting the reaction of the wheels, through the operating mechanism, to the piston 5. As a result, the piston 5 may be moved slightly to the left, thereby cushioning the braking action of the apparatus against the volume of air in cylinder 4.

If the operator desires to make a more powerful brake application, he moves lever L to its $p^2$ position, in which contact 46—49 is closed. The operation of the apparatus is then similar to that just described with the following exceptions. Valve V⁴ is now initially energized, over a circuit which includes contact 41—42 of circuit controller S⁵, and which passes from battery B through wire 55, contact 46—49 of lever L, line wire 71, contact 41—42 of circuit controller S⁵, wires 72, 67 and 58, winding 24 of valve V⁴, and line wire 59 back to battery B. When piston 5 has moved to the position where contact 41—42 of circuit controller S⁴ opens, the circuit just traced for valve V⁴ is opened and valve V⁴ then becomes deenergized, but when contact 41—43 of circuit controller S⁵ subsequently becomes closed, if the pressure in the right hand end of cylinder 4 is then below 40 pounds per square inch, valve V⁴ again becomes energized by virtue of a branch for the circuit just traced, which passes from line wire 71, through contact 41—43 of circuit controller S⁵, wire 73, contact 45—45ᵃ of pressure responsive device P⁴⁰, and wires 65 and 66 to wire 67. If the pressure in the right hand end of cylinder 4 exceeds 50 pounds per square inch when contact 41—43 of circuit controller S⁵ becomes closed, so that contact 45—45ᵇ of pressure responsive device P⁴⁰ is closed, valve V³ then becomes energized, the circuit for this valve passing from battery B through wire 55, contact 46—49 of lever L, line wire 71, contact 41—43 of circuit controller S⁵, wire 73, contact 45—45ᵇ of pressure responsive device P⁴⁰, wires 74, 68 and 69, winding 24 of valve V³, and line wire 59 back to battery B. It will be apparent, therefore that when lever L occupies its P² position, the piston 5 is forced toward the left hand end of cylinder 4, and is held against auxiliary piston 6, by fluid under a pressure of between 40 and 50 pounds per square inch.

If the operator moves lever L to its $p^3$ position, a circuit is completed for valve V⁴ from battery B through wire 55, contact 46—50 of lever L, line wire 76, contact 45—45ᵃ of pressure responsive device P⁷⁰, wires 66, 67 and 58, winding 24 of valve V⁴, and line wire 59 back to battery B. Valve V⁴ therefore becomes energized and remains energized as long as the pressure in the right hand end of cylinder 4 is below 70 pounds per square inch. If the pressure in this end of the cylinder exceeds 70 pounds per square inch, contact 45—45ᵃ of pressure responsive device P⁷⁰ will open and will interrupt the circuit just traced for valve V⁴, and valve V⁴ will become deenergized. If the pressure in the right hand end of cylinder 4 exceeds 80 pounds per square inch, valve V³ will become energized and will vent the right hand end of cylinder 4 to atmosphere, the circuit for valve V³ under these conditions being from battery B through wire 55, contact 46—50 of lever L, line wire 76, contact 45—45ᵇ of pressure responsive device P⁷⁰, wires 75, 68 and 69, winding 24 of valve V³, and line wire 59 back to battery B. Under these conditions, therefore, piston 5 is held against piston 6 by a pressure of between 70 and 80 pounds per square inch.

If it is desirable to apply still higher braking forces, the operator moves lever L to its $p^4$ position, thereby opening contact 46—54 and closing contacts 46—51 and 46—53. When contact 46—54 is opened, the circuit previously traced for valve V¹ is interrupted, and valve $V^1$ becomes deenergized, so that the supply of fluid pressure to the left hand end of cylinder 4 is cut off. When contact 46—53 of lever L becomes closed, a circuit is completed for valve $V^2$ which passes from battery B through wire 55, contact 46—53 of lever L, line wire 78, contact 34—35 of circuit controller $S^2$, wire 79, winding 24 of valve $V^2$, and line wire 59 back to battery B. Valve $V^2$ therefore becomes energized, and since all circuits for valve $V^3$ are now open so that valve $V^3$ is deenergized, the left hand end of cylinder 4 is vented to atmosphere. When contact 46—51 of lever L becomes closed, a circuit is completed for valve $V^4$ from battery B through wire 55, contact 46—51 of lever L, line wire 80, winding 24 of valve $V^4$, and line wire 59 back to battery B. Valve $V^4$ therefore becomes energized so that full line pressure is supplied to the right hand end of cylinder 4, and since the left hand end of the cylinder is vented to atmosphere, this pressure moves the pistons 5 and 6 to the extreme left hand end of the cylinder. It should be noted, however, that due to the throttling restriction 27 in the pipe 26, the rate at which fluid can escape from the left hand end of cylinder 4 during this movement of piston 6 is limited to a value which causes momentary compression of the fluid which remains in the cylinder between the piston and the adjacent end of the cylinder, thereby cushioning the action of the entire apparatus. The construction of the parts is such that the additional movement of the piston 5 beyond the point at which it engages piston 6 when this piston occupies its projected position, brings lever 9 into a position in which the toggle of which it forms a part is on dead-center. When the parts occupy these positions, the reaction of the wheels can not be transmitted back to piston 5 and the entire forces exerted by the springs 17, 18, 19 and 20 of the resilient connections are available to hold the braking bars against the wheels of a car.

It should be observed that if the operator moves the lever L from a position corresponding to a higher braking force to a position corresponding to a lower braking force, the apparatus immediately and automatically reduces the braking pressure to a value corresponding to the new position of the lever in a manner which will be apparent from the drawing without tracing the sequence of operation in detail.

In order to restore the apparatus from its closed or effective position to its open or ineffective position, the operator moves lever L to its $p^5$ position in which it is illustrated in the drawing. The circuit previously traced for valve $V^1$ then becomes closed at contact 46—54 of lever L, and valve $V^1$ therefore becomes energized and admits fluid pressure to the left hand end of cylinder 4 so that the auxiliary piston 6 is moved to its projected position in which it is illustrated in the drawings. The closing of contact 46—52 of lever L under these conditions completes a circuit for valve $V^2$ which is the same as that previously described for this valve in connection with position $p^4$ of the lever, except that this circuit now includes contact 46—52 of lever L instead of contact 46—53. Valve $V^2$ therefore becomes energized, and since valve $V^1$ is energized, fluid pressure is admitted to pipe 28 and hence to the region between the pistons 5 and 6. Furthermore, the closing of contact 46—47 of lever L permits current to flow from battery B through wire 55, contact 46—47 of lever L, line wire 81, contact 36—37 of circuit controller $S^3$, wire 69, winding 24 of valve $V^3$, and line wire 59 back to battery B. Valve $V^3$ therefore becomes energized to disconnect pipe 28 from atmosphere and to connect pipe 29 with atmosphere. When pipe 29 is connected with atmosphere, the pressure in the right hand end of cylinder 4 is exhausted, and the pressure between the pistons 5 and 6 therefore moves piston 5 toward the right to restore the braking apparatus to its open or ineffective position in which it is illustrated in the drawings. If the pressure in the region of cylinder 4 between the pistons 5 and 6 exceeds 30 pounds per square inch during the movement of piston 5 toward the right, contact 45—45$^a$ of pressure responsive device $P^{30}$ will open and will interrupt the circuit previously traced for valve $V^1$. Valve $V^1$ will, therefore, become deenergized and cut off the supply of fluid pressure to the region between the auxiliary piston 6 and the adjacent end of the cylinder, and between the pistons 5 and 6. After the pressure has again dropped below 30 pounds per square inch, contact 45—45$^a$ of pressure responsive device $P^{30}$ will again become closed to restore the circuit for valve $V^1$. When piston 5 reaches its right hand position, contact 32—33 of circuit controller $S^1$, contact 34—35 of circuit controller $S^2$, and contact 36—37 of circuit controller $S^3$ all open, thereby opening the circuits for the valves $V^1$, $V^2$ and $V^3$, respectively. The valves $V^1$, $V^2$ and $V^3$ therefore become deenergized and the parts are then all restored to their normal conditions in which they are illustrated in the drawings. When the valves $V^1$ and $V^2$ are deenergized, the pipe 26 communicating with the left hand end of piston 4 is blanked, and the fluid pressure which has already been supplied to the left hand end of cylinder 4 is now trapped in the cylinder 4 to hold the auxiliary piston 6 in its projected position.

It should be noted that when the parts are in the positions in which they are illustrated in the drawings, if valve $V^4$ should leak, pressure might build up on the right hand side of piston 5 to start the movement of this piston toward the left and operate the braking apparatus toward its closed position. As soon as the movement of piston 5 commences under these conditions, however, contact 36—37 of circuit controller $S^3$ will become closed and will complete the circuit previously traced for valve $V^3$, so that valve $V^3$ will become energized, thereby exhausting the right hand end of cylinder 4 to atmosphere. Furthermore, if the leakage past valve $V^4$ is so great that the piston 5 continues its movement toward the left even after valve $V^3$ becomes energized, contact 32—33 of circuit controller $S^1$ and contact 34—35 of circuit controller $S^2$ will become closed. Valves $V^1$ and $V^2$ will therefore become energized and admit fluid pressure to cylinder 4 between pistons 5 and 6, thereby positively restoring the apparatus to its ineffective position. It will be noted that this operation is entirely automatic.

Figure 2:
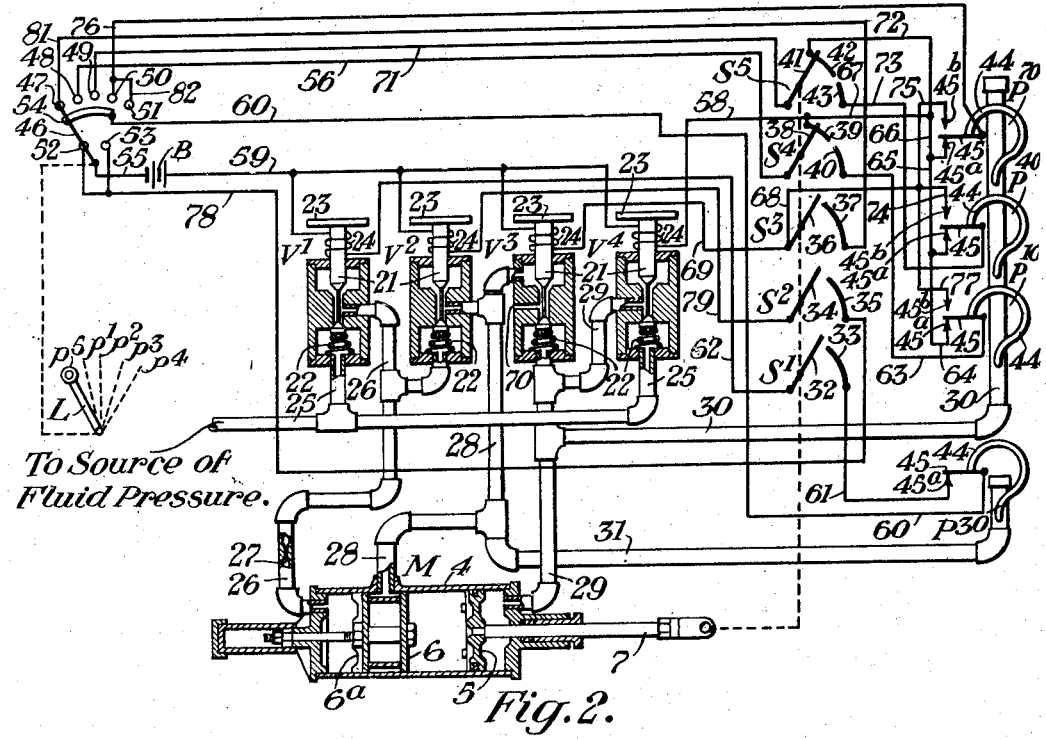

Referring now to Fig. 2, the apparatus here shown is similar to that shown in Fig. 1, except that fixed contact 51 of lever L, instead of being connected with wire 58 by means of line wire 80 as shown in Fig. 1, is connected with line wire 76 by means of wire 82. As a result, when lever L is moved to its $p^4$ position in Fig. 2, valve $V^4$, instead of becoming energized over the circuit previously described for this valve in connection with Fig. 1, now becomes energized over a circuit which passes from battery B, through wire 55, contact 46—51 of lever L, wire 82, line wire 76, contact 45—45$^a$ of pressure responsive device $P^{70}$, wires 66, 67, and 58, winding 24 of valve $V^4$, and line wire 59 back to battery B. Fluid is therefore admitted to the right hand end of cylinder 4 until the pressure in this end of the cylinder exceeds 70 pounds per square inch, at which time contact 45—45$^a$ of pressure responsive device $P^{70}$ opens and interrupts the circuit just traced for valve $V^4$, so that this valve becomes deenergized. If the pressure in the right hand end of cylinder 4 exceeds 80 pounds per square inch for any reason, contact 45—45$^b$ of pressure responsive device $P^{70}$ will become closed, thereby completing a circuit for valve $V^3$ from battery B through wire 55, contact 46—51 of lever L, wire 82, line wire 76, contact 45—45$^b$ of pressure responsive device $P^{70}$, wires 75, 68 and 69, winding 24 of valve $V^3$, and line wire 59 back to battery B. Valve $V^3$ will therefore become energized and will vent the right hand end of cylinder 4 to atmosphere until the pressure again decreases below 80 pounds per square inch, at which time this valve will become deenergized. It will be apparent, therefore, that with the apparatus shown in Fig. 2, when lever L occupies its $p^4$ position, piston 5 is forced toward the left by a pressure of between 70 and 80 pounds per square inch instead of by full line pressure as was the case in Fig. 1. The operation of the apparatus in all other respects is the same as that described in connection with Fig. 1.

One advantage of the apparatus shown in Fig. 2 over that shown in Fig. 1, is that with the apparatus shown in Fig. 2, only seven line wires are required, whereas with the apparatus shown in Fig. 1, eight line wires are necessary, between the car retarder location and the control point at which lever L is situated.

Figure 3:
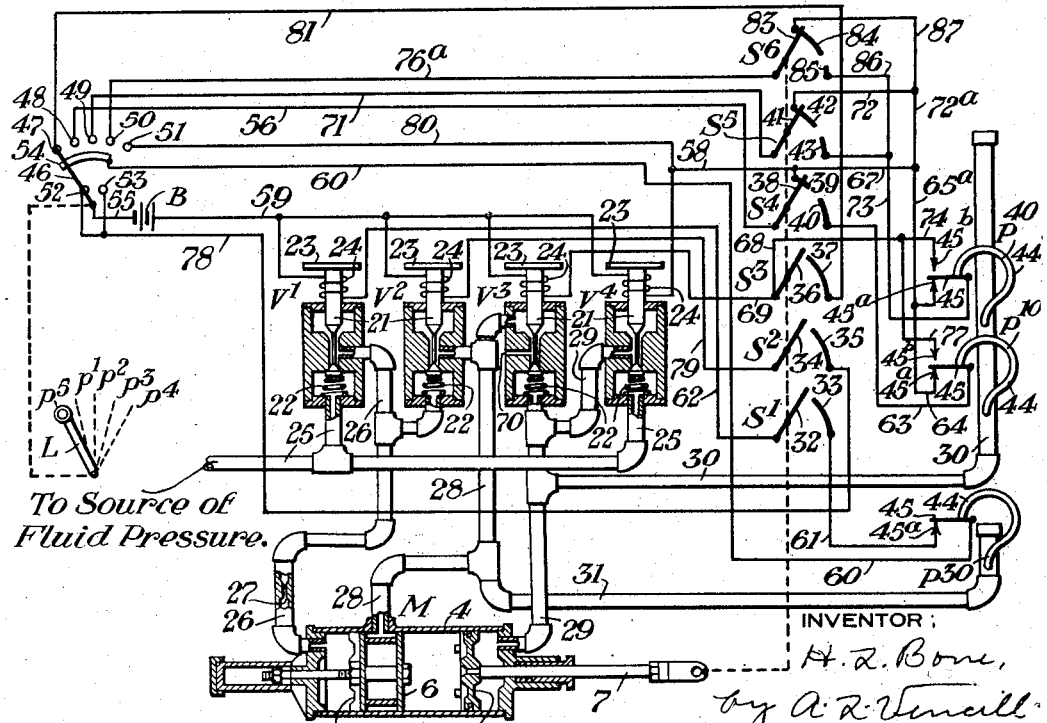

Referring now to Fig. 3, the only difference between the apparatus here shown and that shown in Fig. 1, is that, when lever L is moved to its $p^3$ position in Fig. 3, the circuits which control the valves $V^3$ and $V^4$ are controlled by a circuit controller $S^6$ operated by the motor M, and by the pressure responsive device $P^{40}$, instead of by the pressure responsive device $P^{70}$ shown in Fig. 1. The circuit controller $S^6$ comprises a contact 83—84 which is closed when piston 5 occupies its extreme right hand position, and which remains closed during movement of piston 5 toward the left until shortly after the piston has passed the position in its stroke at which it engages the auxiliary piston 6 when the auxiliary piston 6 is in its projected position. The circuit controller $S^6$ also comprises a contact 83—85 which is open when piston 5 occupies its extreme right hand position, but which becomes closed when and only when the piston has moved to its extreme left hand position.

With the apparatus constructed as here shown, when lever L is moved to its $p^3$ position from a position corresponding to a lower braking pressure, valve $V^4$ becomes energized over a circuit which passes from battery B, through wire 55, contact 46—50 of lever L, line wire 76$^a$, contact 83—84 of circuit controller $S^6$, wires 87, 72$^a$, 67 and 58, winding 24 of valve $V^4$, and line wire 59 back to battery B. Valve $V^1$ is energized under these conditions by virtue of the circuit previously traced for this valve in connection with Fig. 1 and, it will be apparent, therefore, that auxiliary piston 6 is held in its projected position, in which it is shown in the drawing, and the main piston 5 is held against piston 6, by fluid at full line pressure.

If lever L is moved to its $p^3$ position from its $p^4$ position, a circuit will be completed for valve $V^3$ from battery B through wire 55, contact 46—50 of lever L, line wire 76$^a$, contact 83—85 of circuit controller $S^6$, wires 86 and 73, contact 45—45$^b$ of pressure responsive device $P^{40}$, wires 74, 68 and 69, winding 24 of valve $V^3$, and line wire 59 back to battery B. Valve $V^3$ will therefore become energized and will exhaust fluid pressure from the right hand end of cylinder 4 until the pressure in this end of the cylinder drops below 50 pounds per square inch, whereupon contact 45—45$^b$ of pressure responsive device $P^{40}$ will open and will interrupt the circuit just traced for valve $V^3$, so that valve $V^3$ will become deenergized. At the same time, valve $V^1$ will become energized by virtue of the circuit previously traced for this valve which is then closed at contact 46—54 of lever L, and fluid pressure will be admitted to the left hand end of cylinder 4 so that the main piston 5 will be forced toward the right by the auxiliary piston 6 until the auxiliary piston 6 reaches its full projected position. When the auxiliary piston 6 has reached its full projected position, contact 83—85 of circuit controller $S^6$ will open and contact 83—84 of circuit controller $S^6$ will become closed. Valve $V^4$ will therefore become energized and admit fluid at full line pressure to the right hand end of cylinder 4, so that piston 5 will be held against piston 6 by full line pressure. The operation of the apparatus for the other positions of the lever is substantially the same as that described in connection with Fig. 1.

Figure 4:
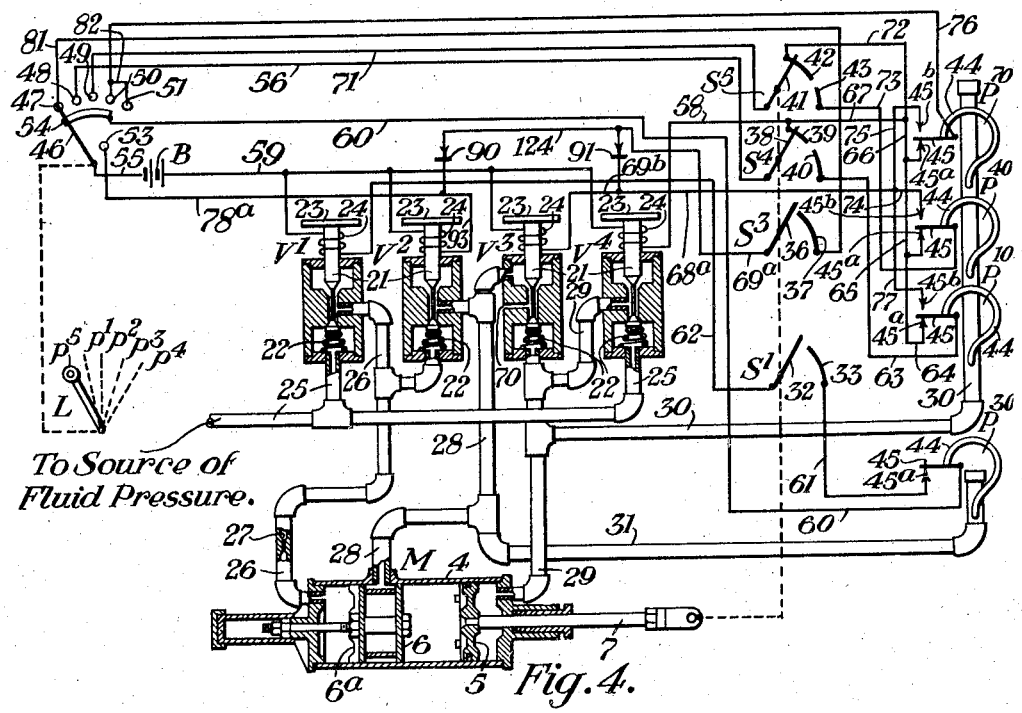

Referring now to Fig. 4, the apparatus here shown is similar to that shown in Fig. 2, except for certain changes in the circuit which is completed for valve $V^2$ when lever L is moved to its $p^4$ position, and in the circuits which are completed for the valves $V^2$ and $V^3$ when lever L is moved to its $p^5$ position.

As here shown, the circuit which is completed for valve $V^2$ when lever L is moved to its $p^4$ position passes from battery B through wire 55, contact 46—53 of lever L, line wire $78^a$, wire 93, winding 24 of valve $V^2$, and line wire 59 back to battery B. The circuit which is completed for valve $V^2$ when lever L is moved to its $p^5$ position passes from battery B through wire 55, contact 46—47 of lever L, line wire 81, contact 36—37 of circuit controller $S^3$, wires $69^a$ and 124, asymmetric unit 90 in its low resistance direction, wire 93, winding 24 of valve $V^2$, and line wire 59 back to battery B. The circuit which is completed for valve $V^3$ when lever L is moved to its $p^5$ position passes from battery B through wire 55, contact 46—47 of lever L, line wire 81, contact 36—37 of circuit controller $S^3$, wire $69^a$, asymmetric unit 91 in its low resistance direction, wire $69^b$, winding 24 of valve $V^3$, and line wire 59 back to battery B. The operation of the apparatus here shown is substantially the same as that previously described in connection with Figs. 1 and 2, and will be readily understood from an inspection of the drawings.

It should be pointed out that, with the apparatus constructed as here shown, when any of the circuits previously traced for valve $V^4$ including the contact $45-45^b$ of the pressure responsive device $P^{10}$, $P^{40}$, or $P^{70}$ is closed, the asymmetric unit 91 prevents current from being supplied to valve $V^2$, and that when the circuit for valve $V^2$ is closed at contact 46—53 of lever L, the asymmetric unit 90 prevents current from being supplied to valve $V^3$.

Figure 5:
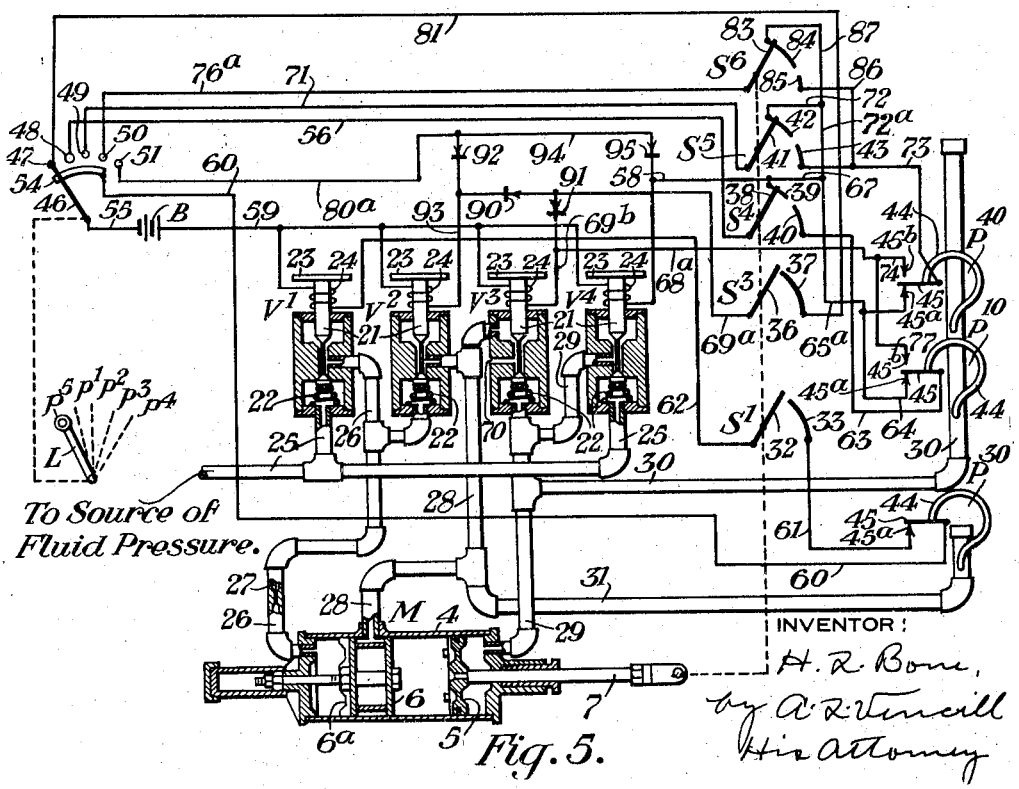

Referring now to Fig. 5, with the apparatus constructed in the manner here shown, the control circuits which are completed for the magnet valves when lever L is moved to its $p^1$ or its $p^2$ positions, and the operation of the apparatus under these conditions, are substantially the same as have been described in detail in connection with Fig. 1. The control circuits which are completed for the magnet valves when lever L is moved to its $p^3$ position, and the operation of the apparatus under these conditions, are substantially the same as have been described in connection with Fig. 3. The control circuits which are completed for the magnet valves when lever L is moved to its $p^5$ position, are the same as those described in connection with Fig. 4, and the operation of the apparatus under these conditions is the same as that described in connection with Fig. 1. When lever L is moved to its $p^4$ position, however, a circuit is now completed for valve $V^2$ at contact 46—51 of lever L, over which circuit current flows from battery B, through wire 55, contact 46—51 of lever L, line wire $80^a$, asymmetric unit 92 in its low resistance direction, wire 93, winding 24 of valve $V^2$, and line wire 59 back to battery B. A circuit is also completed for valve $V^4$ at contact 46—51 of lever L under these conditions, and current flows from battery B through wire 55, contact 46—51 of lever L, line wire $80^a$, wire 94, asymmetric unit 95 in its low resistance direction, winding 24 of valve $V^4$, and line wire 59 back to battery B. Valves $V^2$ and $V^4$ therefore both become energized so that the left hand end of cylinder 4 is vented to atmosphere, and the right hand end of cylinder 4 is supplied with fluid at full line pressure. Piston 5 is therefore moved to its extreme left hand position in which the toggle comprising the lever 9 and links 11 and 14 (Fig. 1) is on dead-center, so that if a car then occupies the braking apparatus, the braking bars will engage the wheels and exert their maximum braking force.

It should be noted that with the apparatus constructed in the manner as shown, the asymmetric unit 92 prevents current from being supplied to valve $V^4$ when valve $V^2$ is energized over the circuit including contact 36—37 of circuit controller $S^3$ and asymmetric unit 90, and that the asymmetric unit 95 prevents valve $V^2$ from being supplied with current when valve $V^4$ is energized over any of the circuits for valve $V^4$ except the circuit including the asymmetric unit 95.

Figure 6:
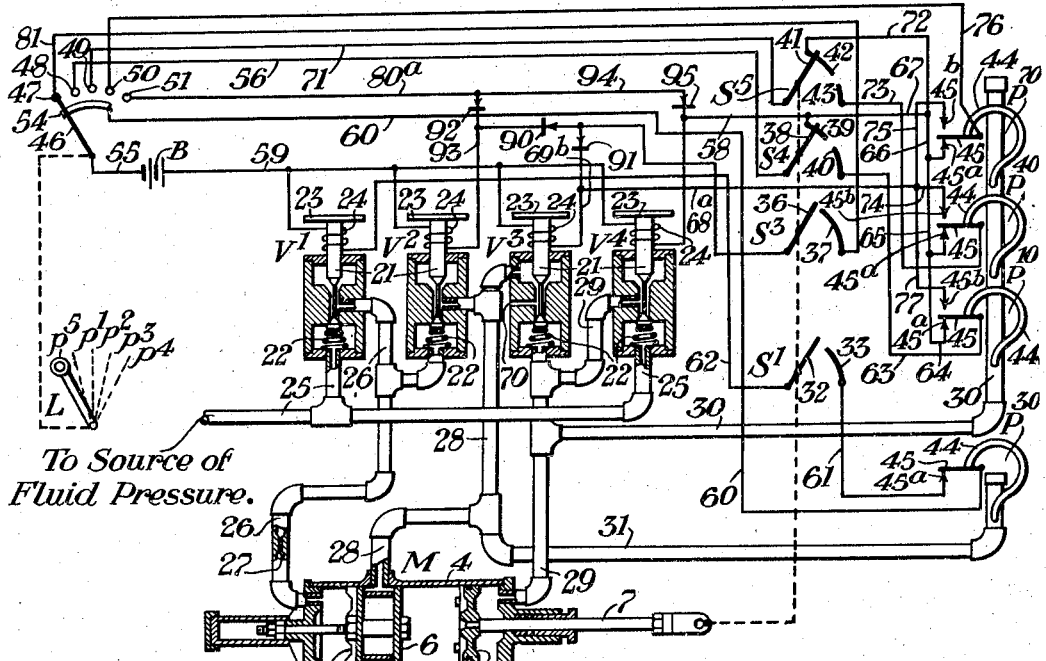

Referring now to Fig. 6, the only difference between the apparatus here shown and that shown in Fig. 5 is that when lever L is moved to its $p^3$ position in Fig. 6, valves $V^3$ and $V^4$, instead of being controlled by circuit controller S⁶ and by pressure responsive device P⁴⁰ in the manner shown in Fig. 5, are controlled by pressure responsive device P⁷⁰ in the manner described in connection with Fig. 1. As a result, when lever L occupies its $p^3$ position in Fig. 6, piston 5 is held against piston 6 by fluid at a pressure of between 70 and 80 pounds per square inch instead of by full line pressure, as was the case in Fig. 5. The operation of the apparatus shown in Fig. 6 will be readily understood from an inspection of the drawings in connection with the description of the preceding figures.

Figure 7:
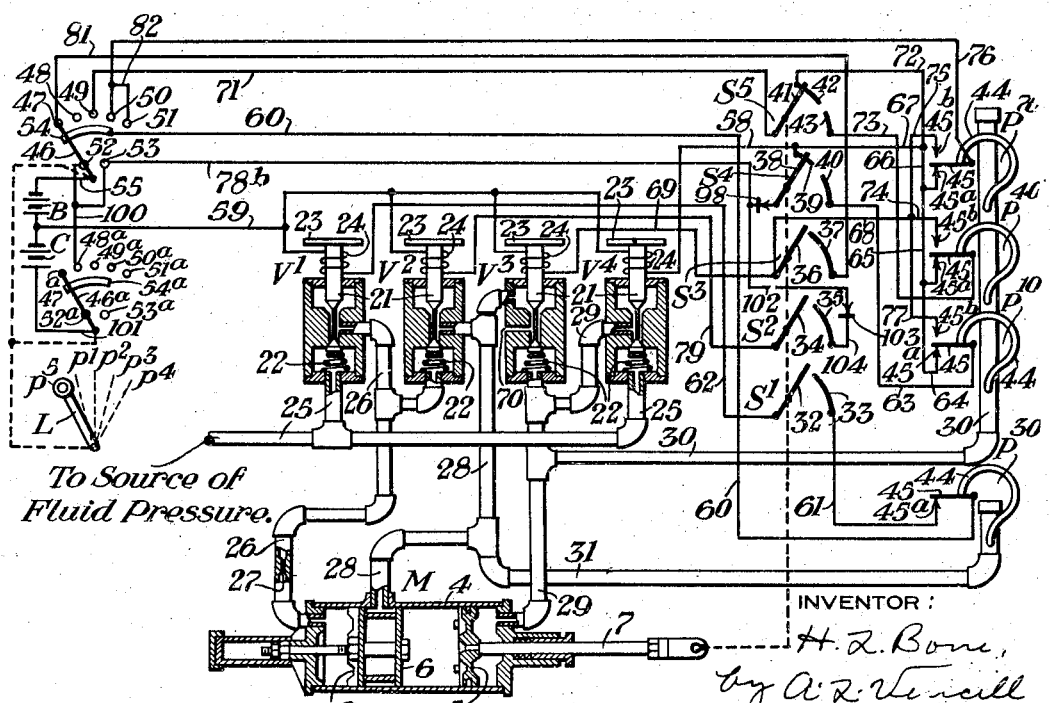

Referring next to Fig. 7, as here shown lever L is provided with a second contact arm 46ª adapted to engage a selected one or ones of a plurality of fixed contacts in such manner that when contact arm 46 engages a given fixed contact, the contact arm 46ª will engage a similar fixed contact designated by a similar reference character with the distinguishing exponent $a$. For example, when lever L occupies its $p^5$ position, in which it is illustrated in the drawing, so that the contact arm 46 engages fixed contact 47, contact arm 46ª engages fixed contact 47ª; and, when lever L occupies its $p^1$ position, so that contact arm 46 engages fixed contact 48, contact 46ª engages fixed contact 48ª, etc. The contact arm 46ª is arranged to control the supply of current to certain of the valves V from a source of electromotive force here shown as a battery C.

The operation of the apparatus here shown is as follows: When the parts are in the positions in which they are illustrated in the drawing, if the operator wishes to make a comparatively light brake application, he moves lever L to its $p^1$ position. A circuit is then completed for valve V⁴ at contact 46ª—48ª of lever L, and current flows from battery C through line wire 59, winding 24 of valve V⁴, wire 58, contact 38—39 of circuit controller S⁴, asymmetric unit 98 in its low resistance direction, line wire 78ᵇ, wire 100, contact 46ª—48ª of lever L, and wire 101 back to battery C. Valve V⁴ therefore becomes energized and admits fluid to the right hand end of cylinder 4 at full line pressure so that piston 5 moves towards the left, thereby moving the braking apparatus towards its effective position. Soon after piston 5 starts to move towards the left, contact 32—33 of circuit controller S¹ closes and completes the circuit previously traced for valve V¹ in connection with Fig. 1. Valve V¹ therefore also becomes energized and admits fluid pressure to the left hand end of cylinder 4 to hold auxiliary piston 6 in its projected position. When the piston 5 has moved to the position where the braking apparatus is in its effective position, contact 38—39 of circuit controller S⁴ opens, and upon slight additional movement of piston 5 towards the left, contact 38—40 of circuit controller S⁴ becomes closed. When contact 38—39 opens, the circuit for valve V⁴ which was previously closed at this contact is opened, so that valve V⁴ becomes deenergized, and when contact 38—40 becomes closed, if the pressure in the right hand end of cylinder 4 is then below 10 pounds per square inch so that contact 45—45ª of pressure responsive device P¹⁰ is closed, a branch for the circuit just traced for valve V⁴ is closed. This branch passes from wire 58, through wires 67, 66, 65 and 64, contact 45—45ª of pressure responsive device P¹⁰, wire 63, contact 38—40 of circuit controller S⁴, and asymmetric unit 98 to line wire 78ᵇ. Valve V⁴ therefore again becomes energized, and admits fluid to the right hand end of cylinder 4 until the pressure in the right hand end of the cylinder exceeds 10 pounds per square inch at which time this valve again becomes deenergized. If the pressure in the right hand end of cylinder 4 exceeds 20 pounds per square inch when contact 38—40 of circuit controller S⁴ becomes closed, so that contact 45—45ᵇ of pressure responsive device P¹⁰ is closed, as is usually the case, a circuit is then completed for valve V³ which passes from battery C through line wire 59, winding 24 of valve V³, wires 69, 68 and 77, contact 45—45ᵇ of pressure responsive device P¹⁰, wire 63, contact 38—40 of circuit controller S⁴, asymmetric unit 98 in its lower resistance direction, line wire 78ᵇ, wire 100, contact 46ª—48ª of lever L, and wire 101 back to battery C. Valve V³ therefore becomes energized and exhausts fluid from the right hand end of cylinder 4 until the pressure is below 20 pounds per square inch.

If the operator wishes to cause a more powerful brake application, he moves lever L to its $p^2$ or $p^3$ position instead of its $p^1$ position. Under these conditions, the control circuits which are completed for the valves, and operation of the apparatus are the same as were previously described in connection with Fig. 1 for similar conditions.

If the operator moves lever L to its $p^4$ position, the circuit previously described for valve V⁴ in connection with Fig. 2 is closed at contact 46—51 of lever L, so that valve V⁴ then becomes energized and admits fluid pressure to the right hand end of cylinder 4 until the pressure in this end of the cylinder exceeds 70 pounds per square inch, at which time contact 45—45ª of pressure responsive device P⁷⁰ opens and deenergizes valve V⁴. A circuit is also completed under these conditions for valve V² over which current flows from battery B through wire 55, contact 46—53 of lever L, line wire 78ᵇ, wire 102, asymmetric unit 103 in the low resistance direction, wire 104, contact 34—35 of circuit controller S², wire 79, winding 24 of valve V², and line wire 59 back to battery B. Valve V² therefore becomes energized and vents the left hand end of cylinder 4 to atmosphere thereby permitting piston 5 to move to its extreme left hand position. It will be apparent, therefore, that when lever L occupies its $p^4$ position, the braking bars exert their maximum braking force upon the wheels of a car occupying the braking apparatus.

If, when the braking apparatus is in its effective position, the operator wishes to restore it to its ineffective position, he moves lever L to its $p^5$ or "off" position. Under these conditions, the circuit for valve $V^3$ previously described in connection with Fig. 1 is closed at contact 46—47 of lever L, and the circuit previously described for valve $V^1$ is also closed at contact 46—54 of lever L. Furthermore, a circuit is now completed for valve $V^2$ at contact 46—52 of lever L, and current flows from battery B, through wire 55, contact 46—52 of lever L, line wire $78^b$, wire 102, asymmetric unit 103 in its low resistance direction, wire 104, contact 34—35 of circuit controller $S^2$, wire 79, winding 24 of valve $V^2$, and line wire 59 back to battery B. As a result, the valves $V^1$, $V^2$ and $V^3$ all become energized so that fluid at a pressure of 30 pounds per square inch is admitted to the region of cylinder 4 between the auxiliary piston 6 and the adjacent end of the cylinder, and to the region of the cylinder between the auxiliary piston 6 and the main piston 5, while the region of cylinder 4 between the main piston 5 and the right hand end of the cylinder is vented to atmosphere. The auxiliary piston 6 is therefore moved to its projected position, and the main piston 5 is moved to its extreme right hand position, in which it is illustrated in the drawings. When the piston 5 reaches its extreme right hand position, contact 32—33 of circuit controller $S^1$, contact 34—35 of circuit controller $S^2$, and contact 36—37 of circuit controller $S^2$ all become opened, so that the valves $V^1$, $V^2$ and $V^3$ then become deenergized. The apparatus is then restored to the condition in which it is illustrated in the drawings.

It should be pointed out that with the apparatus constructed in the manner just described, the asymmetric unit 103 prevents current from being supplied from battery C to the winding 24 of valve $V^2$ over line wires 59 and $78^b$ when lever L occupies its $p^2$ position, and that the asymmetric unit 98 prevents current from being supplied to the valve $V^4$ over line wire $78^b$ when the lever L occupies its $p^4$ or $p^5$ positions.

One advantage of the apparatus shown in Fig. 7 over that shown in any of the preceding views is that, with the apparatus shown in Fig. 7 only six line wires are required, whereas with the apparatus shown in any of the preceding views, at least seven line wires are necessary.

Figure 8:
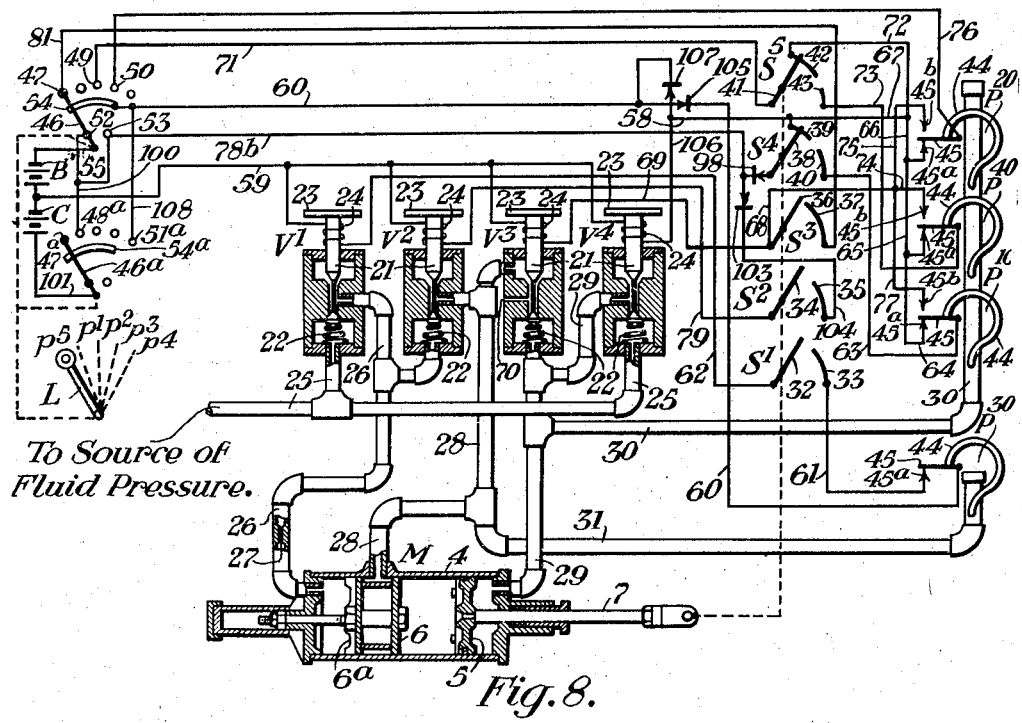

Referring now to Fig. 8, the apparatus here shown is similar to the apparatus shown in Fig. 7 with the following exceptions. As here shown, when lever L is moved to its $p^4$ position, valve $V^4$ instead of becoming energized over the circuit described in connection with Fig. 7, now becomes energized by virtue of a circuit which is controlled by contact $46^a$—$51^a$ of lever L, and over which current flows from battery C through line wire 59, winding 24 of valve $V^4$, wire 106, asymmetric unit 107 in its low resistance direction, line wire 60, wire 108, contact $46^a$—$51^a$ of lever L, and wire 101 back to battery C. Under these conditions, therefore, valve $V^4$ admits fluid at full line pressure to the right hand end of cylinder 4 instead of fluid at a pressure between 70 and 80 pounds per square inch as is the case in Fig. 7. Furthermore, since a part of the circuit just described is common to the circuit over which valve $V^1$ is supplied with current when contact 46—54 of lever L is closed, an asymmetric unit 105 is included in the circuit for valve $V^1$ in such manner that valve $V^1$ is prevented from being supplied with current when the circuit for valve $V^4$ is closed. The operation of the apparatus in all other respects is the same as that described in connection with Fig. 7.

Figure 9:
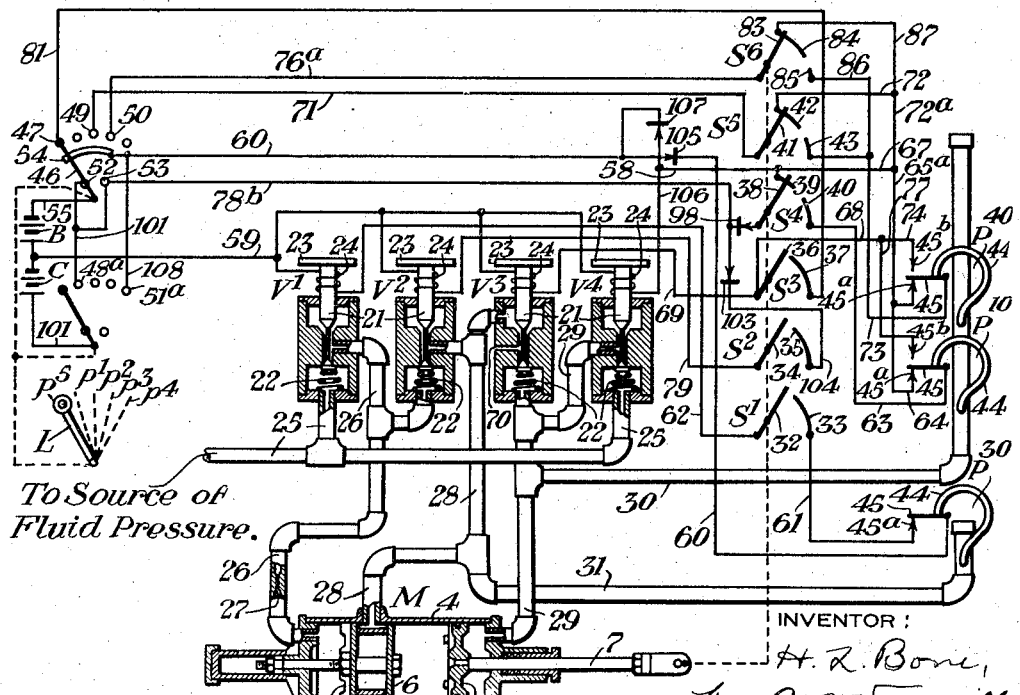

Referring now to Fig. 9, the apparatus here shown is similar to the apparatus shown in Fig. 8 with the exception that when lever L is moved to its $p^3$ position, the valves $V^3$ and $V^4$ are controlled by the circuit controller $S^6$ and by pressure responsive device $P^{40}$ in the manner previously described in connection with Fig. 3 instead of by the pressure responsive device $P^{70}$ shown in Fig. 8, so that, under these conditions, piston 5 is held against piston 6 by full line pressure instead of by a pressure of between 70 and 80 pounds per square inch as is the case when these valves are controlled by the pressure responsive device $P^{70}$. The operation of the apparatus will be readily understood from an inspection of the drawings in connection with the description of the preceding views.

Figure 10:
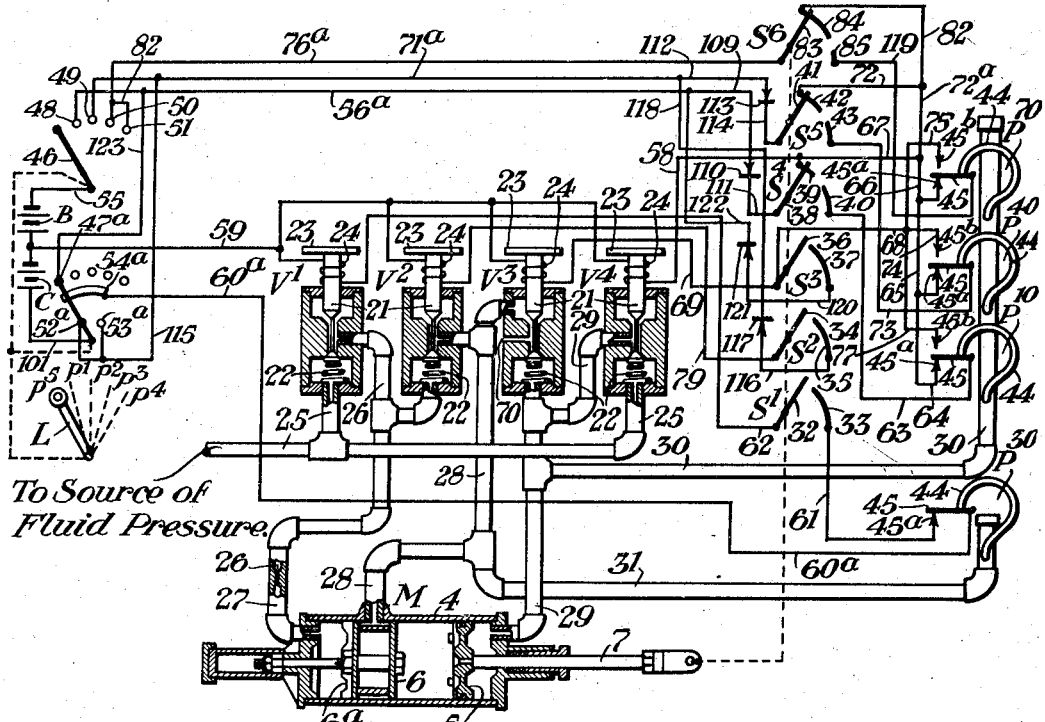

Referring now to Fig. 10, with the apparatus constructed in the manner here shown, if lever L is moved to its $p^1$ position when the braking apparatus is in its non-effective position, a circuit for valve $V^4$ is completed at contact 46—48 of lever L, and current flows from battery B through wire 55, contact 46—48 of lever L, line wire $56^a$, wire 109, asymmetric unit 110 in its low resistance direction, wire 111, contact 38—39 of circuit controller $S^4$, wire 58, winding 24 of valve $V^4$, and line wire 59 back to battery B. Valve $V^4$ therefore becomes energized and admits fluid at full line pressure to the right hand end of cylinder 4 to move piston 5 towards the left, and the braking bars towards their braking positions. Shortly after piston 5 starts to move towards the left, a circuit for valve $V^1$ is completed at contact 32—33 of circuit controller S¹, and current flows from battery C through line wire 59, winding 24 of valve V¹, wire 62, contact 32—33 of circuit controller S¹, wire 61, contact 45—45ª of pressure responsive device P³⁰, which contact remains closed since the pressure responsive device is not connected to that part of the cylinder between piston 6 and the extreme left end of the cylinder, line wire 60ª, contact 46ª—54ª of lever L, and wire 101 back to battery C. Valve V¹ therefore also becomes energized, and admits fluid at full line pressure to the left hand end of cylinder 4 to hold auxiliary piston 6 in its projected position. When the braking apparatus reaches its effective position, contact 38—39 of circuit controller S⁴ opens and contact 38—40 becomes closed. When contact 38—39 opens, the circuit for valve V⁴ which was previously closed at this contact is interrupted, and when contact 38—40 becomes closed, if the pressure in the right hand end of cylinder 4 is then below 10 pounds per square inch, a branch for the circuit just traced for valve V⁴ is closed. This branch passes from wire 111 through contact 38—40 of circuit controller S⁴, wire 63, contact 45—45ª of pressure responsive device P¹⁰, and wires 64, 65, 66 and 67 to wire 58. Valve V⁴ therefore again becomes energized, and admits fluid to the right hand end of cylinder 4 until the pressure in this end of cylinder 4 exceeds 10 pounds per square inch, at which time contact 45—45ª of pressure responsive device P¹⁰ opens and deenergizes valve V⁴. If the pressure in the right hand end of cylinder 4 exceeds 20 pounds per square inch when contact 38—40 of circuit controller S⁴ is closed so that contact 45—45ᵇ of pressure responsive device P¹⁰ is closed, a circuit is then completed for valve V³ over which current flows from battery B through wire 55, contact 46—48 of lever L, line wire 56ª, wire 109, asymmetric unit 110 in its low resistance direction, wire 111, contact 38—40 of circuit controller S⁴, wire 63, contact 45—45ᵇ of pressure responsive device P¹⁰, wires 77, 68 and 69, winding 24 of valve V³, and line wire 59 back to battery B. Under these conditions, valve V³ becomes energized and vents the fluid pressure in the right hand end of cylinder 4 to atmosphere until the pressure decreases below 20 pounds per square inch, whereupon contact 45—45ᵇ of pressure responsive device P¹⁰ opens and deenergizes valve V³. It will be apparent, therefore, that when lever L occupies its $p^1$ position, piston 5 is held against piston 6 by a pressure of between 10 and 20 pounds per square inch.

If, now, lever L is moved to its $p^2$ position when the braking apparatus is in its ineffective position in which it is illustrated in the drawings, another circuit for valve V⁴ is then closed at contact 46—49 of lever L, and current flows from battery B through wire 55, contact 46—49 of lever L, line wire 71ª, wire 112, asymmetric unit 113 in its low resistance direction, wire 114, contact 41—42 of circuit controller S⁵, wires 72, 72ª, 67 and 58, winding 24 of valve V⁴, and line wire 59 back to battery B. Valve V⁴ therefore becomes energized and admits fluid at full line pressure to the right hand end of cylinder 4 to move piston 5 toward the left and the braking apparatus to its effective position. Shortly after piston 5 starts to move, the circuit previously traced for valve V¹ including contact 46ª—54ª of lever L becomes closed at contact 32—33 of circuit controller S⁴, so that valve V¹ becomes energized and admits fluid at full line pressure to the left hand end of cylinder 4 to hold the auxiliary piston 6 in its projected position. When the braking apparatus reaches its effective position, contact 41—42 of circuit controller S⁵ opens, and contact 41—43 becomes closed. When contact 41—42 opens the circuit for valve V⁴ which was previously closed at this contact is opened, and when contact 41—43 becomes closed, a branch for the circuit just traced for valve V⁴ becomes closed if the pressure in the right hand end of cylinder 4 is below 40 pounds per square inch. This branch may be traced from wire 114 through contact 41—43 of circuit controller S⁵, wire 73, contact 45—45ª of pressure responsive device P⁴⁰, and wires 65, 66 and 67 to wire 58. Under these conditions, valve V⁴ again becomes energized and admits fluid to the left hand end of cylinder 4 until the pressure in this end of the cylinder exceeds 40 pounds per square inch, whereupon contact 45—45ª of pressure responsive device P⁴⁰ opens and deenergizes valve V⁴. If the pressure in the right hand end of cylinder 4 increases beyond 50 pounds per square inch, contact 45—45ᵇ of pressure responsive device P⁴⁰ closes, and completes a circuit for valve V³ over which current flows from battery B, through wire 55, contact 46—49 of lever L, line wire 71ª, wire 112, asymmetric unit 113, wire 114, contact 41—43 of circuit controller S⁵, wire 73, contact 45—45ᵇ of pressure responsive device P⁴⁰, wires 74, 68 and 69, winding 24 of valve V³, and line wire 59 back to battery B. Valve V⁴ therefore becomes energized and vents the right hand end of cylinder 4 to atmosphere until the pressure has decreased below 50 pounds per square inch. It will be apparent, therefore, that when lever L occupies its $p^2$ position, the piston 5 is held against the auxiliary piston 6 by a pressure of between 40 and 50 pounds per square inch.

If lever L is moved to its $p^3$ position when the braking apparatus is in its ineffective position, a circuit is completed for valve V⁴ at contact 46—50 of lever L, and current flows from battery B through wire 55, contact 46—50 of lever L, line wire 76ª, contact 83—84 of circuit controller S⁶, wires 82, 72ª, 67 and 58, winding 24 of valve $V^4$, and line wire 59 back to battery B. Fluid at full line pressure is therefore admitted to the right hand end of cylinder 4 to drive piston 5 towards the left and the braking apparatus towards its effective position. Shortly after piston 5 starts to move, the circuit previously traced for valve $V^1$ becomes closed at contact 32—33 of circuit controller $S^1$, and valve $V^1$ therefore becomes energized and admits fluid pressure to the left hand end of cylinder 4 to hold piston 6 in its projected position. As pointed out hereinbefore, contact 83—84 of circuit controller $S^6$ remains closed until piston 5 moves past the position at which it engages the auxiliary piston 6 when this piston occupies its projected position, and it will be apparent, therefore, that, under these conditions, valve $V^4$ remains energized so that piston 5 is held against piston 6 by full line pressure.

If lever L is moved to its $p^4$ position when the braking apparatus is in its ineffective position, a circuit is completed for valve $V^4$ which is similar to the circuit which becomes closed for valve $V^4$ when lever L is moved to its $p^3$ position except that this latter circuit includes contact 46—51 of lever L and wire 82 instead of contact 46—50 of lever L. Piston 5 is therefore moved to the left by fluid at full line pressure. Furthermore, as soon as contact 34—35 of circuit controller $S^2$ becomes closed a circuit is also completed for valve $V^2$, and current flows from battery C through line wire 59, winding 24 of valve $V^2$, wire 79, contact 34—35 of circuit controller $S^2$, wire 116, asymmetric unit 117 in its low resistance direction, wire 118, line wire $71^a$, wire 115, contact $46^a$—$53^a$ of lever L, and wire 101 back to battery C. Valve $V^2$ therefore becomes energized and connects the left hand end of cylinder 4 to atmosphere, so that the pistons 5 and 6 now move to their extreme left hand positions. When piston 5 reaches its extreme left hand position, contact 83—84 of circuit controller $S^6$ opens and contact 83—85 becomes closed. When contact 83—84 opens, the circuit for valve $V^4$ is interrupted and valve $V^4$ becomes deenergized. When contact 83—85 becomes closed, if the pressure in the right hand end of cylinder 4 is then below 70 pounds per square inch, a branch is completed for the circuit for valve $V^4$. This branch passes from line wire $76^a$ through contact 83—85 of circuit controller $S^6$, wire 119, contact 45—$45^a$ of pressure responsive device $P^{70}$, and wires 66 and 67 to wire 58. Valve $V^4$ then again becomes energized and admits fluid pressure to the right hand end of cylinder 4 until the pressure in this end of the cylinder exceeds 70 pounds per square inch. If the pressure in the right hand end of cylinder 4 exceeds 80 pounds per square inch when contact 83—85 of circuit controller $S^6$ is closed, a circuit is then completed for valve $V^3$ over which current flows from battery B through wire 55, contact 46—51 of lever L, wire 82, line wire $76^a$, contact 83—85 of circuit controller $S^6$, wire 119, contact 45—$45^b$ of pressure responsive device $P^{70}$, wires 75, 68 and 69, winding 24 of valve $V^3$, and line wire 59 back to battery B. Under these conditions, valve $V^3$ becomes energized and vents the left hand end of cylinder 4 to atmosphere until the pressure again decreases below 80 pounds per square inch. It will be apparent, therefore, that with the apparatus constructed in the manner here shown, when lever L occupies its $p^4$ position, piston 5 is held in its extreme left hand position by fluid at a pressure of between 70 and 80 pounds per square inch.

If, when the braking apparatus is in its effective position, the operator moves lever L to its $p^5$ or "off" position, the circuit previously traced for valve $V^1$ becomes closed at contact $46^a$—$54^a$ of lever L, and valve $V^1$ becomes energized and admits fluid pressure to the left hand end of cylinder 4, so that piston 6 is moved towards its projected position. A circuit is also completed for valve $V^3$ at contact $46^a$—$47^a$ of lever L, and current flows from battery C through line wire 59, winding 24 of valve $V^3$, wire 69, contact 36—37 of circuit controller $S^3$, wire 120, asymmetric unit 121 in its low resistance direction, wire 122, line wire $56^a$, wire 123, contact $46^a$—$47^a$ of lever L, and wire 101 back to battery C. Valve $V^3$ therefore becomes energized to connect pipe 29 with atmosphere and to disconnect pipe 28 from atmosphere, thereby exhausting the right hand end of cylinder 4 and preventing the escape of fluid from cylinder 4 between the pistons 5 and 6. Furthermore, a circuit is completed for valve $V^2$ which is similar to the circuit which was previously closed for this valve at contact $46^a$—$53^a$ of lever L when lever L occupied its $p^4$ position, except that this circuit now includes contact $46^a$—$52^a$ of lever L instead of contact $46^a$—$53^a$. Valve $V^2$ therefore also becomes energized, so that fluid pressure is admitted to the region of cylinder 4 between the pistons 5 and 6. This pressure moves piston 5 to its extreme right hand position, thereby moving the braking apparatus to its ineffective position. When the piston reaches its extreme right hand position, contact 32—33 of circuit controller $S^1$, contact 34—35 of circuit controller $S^2$ and contact 36—37 of circuit controller $S^3$ open, thereby deenergizing the valves $V^1$, $V^2$ and $V^3$ respectively. The apparatus is then restored to the condition in which it is illustrated in the drawings.

Figure 11:
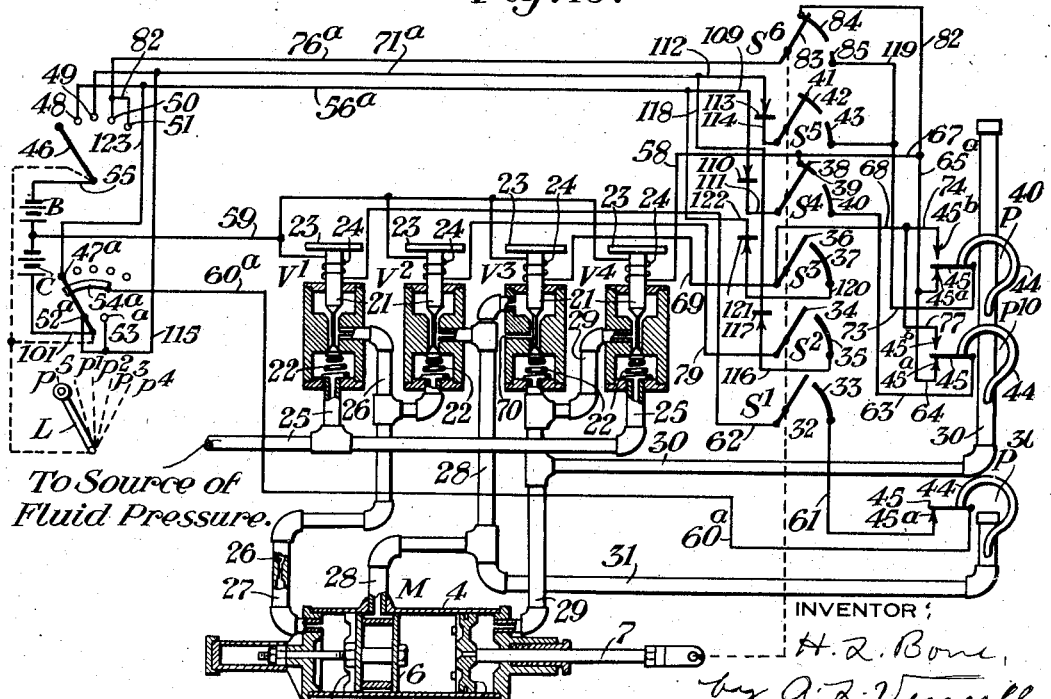

Referring now to Fig. 11, the only difference between the apparatus here shown and that shown in Fig. 10 is that when lever L is moved to its $p^4$ position in Fig. 11, the valves $V^3$ and $V^4$ are controlled by the circuit controller $S^6$ and the pressure responsive device $P^{40}$, in a manner which will be apparent from an inspection of the drawings and the description of the preceding views, instead of by the circuit controller $S^6$ and pressure responsive device $P^{70}$, with the result that when the piston 5 has moved to its extreme left hand position under these conditions, the fluid in the right hand end of cylinder 5 is maintained at a pressure of between 40 and 50 pounds per square inch instead of at a pressure of between 70 and 80 pounds per square inch as is the case when the valves $V^3$ and $V^4$ are controlled by the circuit controller $S^6$ and pressure responsive device $P^{70}$. The operation of the apparatus in all other respects is similar to that described in connection with Fig. 10.

Figure 12:
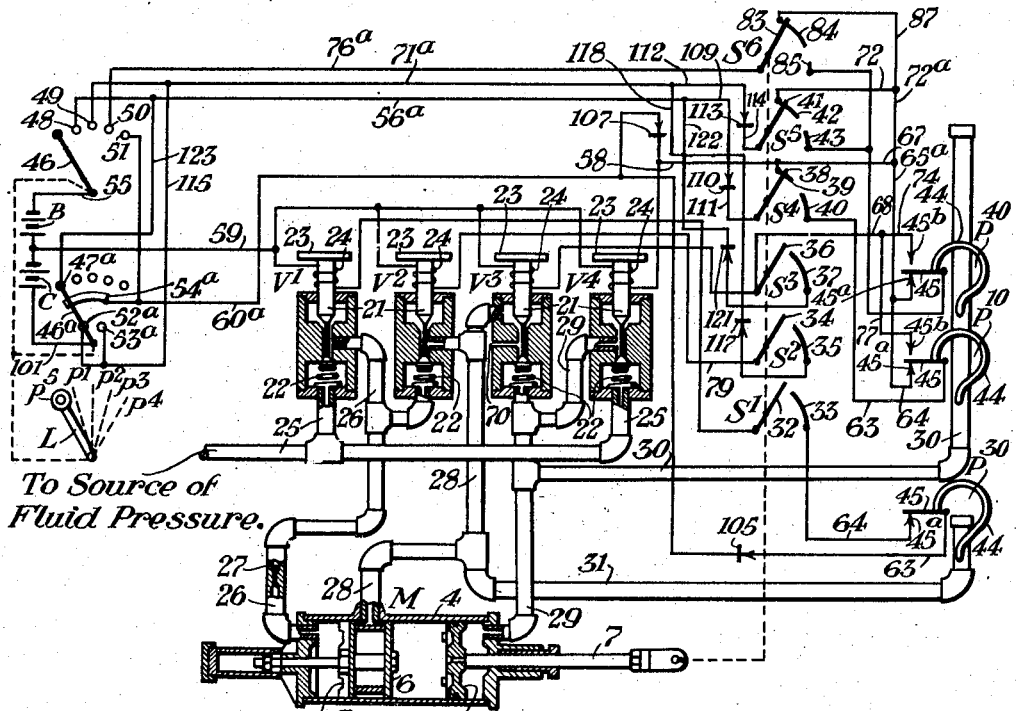

Referring now to Fig. 12 the apparatus here shown is similar to that shown in Fig. 10 with the following exceptions. When lever L is moved to its $p^4$ position in Fig. 12, valve $V^4$, instead of becoming energized over the circuit shown in Fig. 10, now becomes energized by virtue of a circuit passing from battery B through wire 55, contact 46—51 of lever L, line wire $60^a$, asymmetric unit 107 in the low resistance direction, winding 24 of valve $V^4$, and wire 59 back to battery B. As a result under these conditions valve $V^4$ remains energized as long as lever L occupies its $p^4$ position. Furthermore, since part of the circuit just traced for valve $V^4$ is common to the circuit which is completed for valve $V^1$ when contact $46^a$—$54^a$ of lever L is closed, an asymmetric unit 105 is inserted in the circuit for valve $V^1$ in a manner to prevent improper energization of valve $V^1$. The operation of the apparatus here shown will be readily understood from an inspection of the drawings in connection with the foregoing description of Fig. 10.

Figure 13:
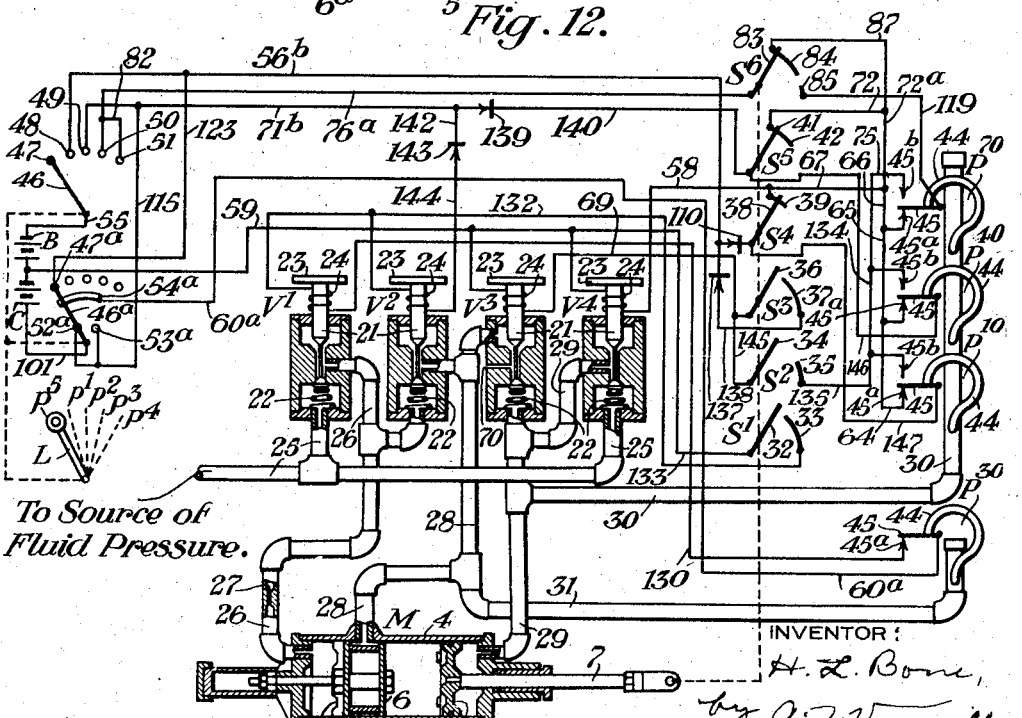

Referring now to Fig. 13, as here shown circuit controller $S^2$ is so designed, that its contact 34—35 will not become closed until after piston 5 has moved to the left far enough so that the braking bars engage the wheels of a car in the braking apparatus. Furthermore, the circuits for the magnet valves have been rearranged in a manner which makes the use of contact 41—43 of circuit controller $S^5$, and contact 39—40 of circuit controller $S^4$ shown in the preceding views, unnecessary.

With the apparatus constructed as here shown, if lever L is moved to its $p^1$ position, a circuit is completed for valve $V^4$ at contact 46—48 of lever L, and current flows from battery B through wire 55, contact 46—48 of lever L, line wire $56^b$, asymmetric unit 110 in its low resistance direction, contact 38—39 of circuit controller $S^4$, wire 58, winding 24 of valve $V^4$, and line wire 59 back to battery B. Valve $V^4$ therefore becomes energized and admits fluid pressure to the right hand end of cylinder 4, so that piston 5 moves toward the left. Shortly after piston 5 starts to move toward the left, a circuit for valve $V^1$ is completed at contact 32—33 of circuit controller $S^1$, and current flows from battery C through line wire 59, wire 133, contact 32—33 of circuit controller $S^1$, wire 132, winding 24 of valve $V^1$, wire 130, contact 45—$45^a$ of pressure responsive device $P^{30}$, line wire $60^a$, contact $46^a$—$54^a$ of lever L, and wire 101 back to battery C. Valve $V^1$ then also becomes energized, and admits fluid at full line pressure to the left hand end of cylinder 4, thereby holding auxiliary piston 6 in its projected position. When piston 5 has moved to the left far enough so that contact 38—39 of circuit controller $S^4$ becomes opened, the circuit just traced for valve $V^4$ is opened, but, if the pressure in the right hand end of cylinder 4 is then below 10 pounds per square inch, so that contact 45—$45^a$ of pressure responsive device $P^{10}$ is closed, valve $V^4$ will remain energized by virtue of a branch for the circuit just traced, which branch passes from line wire $56^b$ through asymmetric unit 110 in its low resistance direction, wire 147, contact 45—$45^a$ of pressure responsive device $P^{10}$, and wires 64, 65, 66 and 67 to wire 58. It usually happens, however, that during the preliminary movement of piston 5, the pressure in the right hand end of cylinder 4 builds up to a value in excess of 20 pounds per square inch, so that contact 45—$45^a$ of pressure responsive device $P^{10}$ is open, and contact 45—$45^b$ is closed. Under these conditions, when contact 38—39 of circuit controller $S^4$ becomes opened, valve $V^4$ will become deenergized. If the pressure in the right hand end of cylinder 4 still exceeds 20 pounds per square inch when contact 34—35 of circuit controller $S^2$ becomes closed, a circuit is then completed for valve $V^3$, and current flows from battery B through wire 55, contact 46—48 of lever L, line wire $56^b$, asymmetric unit 110 in its low resistance direction, wire 147, contact 45—$45^b$ of pressure responsive device $P^{10}$, wire 135, contact 34—35 of circuit controller $S^2$, wires 145 and 69, winding 24 of valve $V^3$, and line wire 59 back to battery B. Under these conditions, valve $V^3$ becomes energized, and vents the right hand end of cylinder 4 to atmosphere until the pressure in this end of the cylinder decreases below 20 pounds per square inch, whereupon contact 45—$45^b$ of pressure responsive device $P^{10}$ opens and deenergizes valve $V^3$. It will be apparent, therefore, that with the apparatus constructed as here shown, when lever L occupies its $p^1$ position, piston 5 is held against piston 6 by a pressure of between 10 and 20 pounds per square inch.

I will now assume that with the apparatus constructed in the manner here shown, lever L is moved to its $p^2$ position when the braking apparatus is in its ineffective position.

Under these conditions, a circuit is completed for valve $V^4$ at contact 46—49 of lever L, and current flows from battery B through wire 55, contact 46—49 of lever L, line wire $71^b$, asymmetric unit 139 in its low resistance direction, wire 140, contact 41—42 of circuit controller $S^5$, wires 72, $72^a$, 67 and 58, winding 24 of valve $V^4$, and line wire 59 back to battery B. Valve $V^4$ therefore becomes energized and admits fluid to the right hand end of cylinder 4 to move piston 5 toward the left, and the braking apparatus to its effective position. Shortly after piston 5 starts to move, the circuit previously traced for valve $V^1$ becomes closed at contact 32—33 of circuit controller $S^1$, so that valve $V^1$ becomes energized and admits fluid at full line pressure to the left hand end of cylinder 4 to hold the auxiliary piston 6 in its projected position. When the piston 5 has moved to the position at which contact 41—42 opens, the circuit just traced for valve $V^4$ is opened, but if the pressure in the right hand end of cylinder 4 is then below 40 pounds per square inch, valve $V^4$ remains energized by virtue of a branch for the circuit just traced for valve $V^4$, which branch may be traced from wire 140 through wire 146, contact 45—$45^a$ of pressure responsive device $P^{40}$, and wires 65 and 66 to wire 67. If, however, the pressure in the right hand end of cylinder 4 exceeds 40 pounds per square inch when contact 41—42 opens, contact 45—$45^a$ of pressure responsive device $P^{40}$ will be opened, so that this branch will be open, and valve $V^4$ will then become deenergized. If, when contact 34—35 of circuit controller $S^2$ becomes closed, the pressure in the right hand end of cylinder 4 exceeds 50 pounds per square inch, so that contact 45—$45^b$ of pressure responsive device $P^{40}$ is closed, a circuit is then completed for valve $V^3$, and current flows from battery B through contact 46—49 of lever L, line wire $71^b$, asymmetric unit 139 in its low resistance direction, wires 140 and 146, contact 45—$45^b$ of pressure responsive device $P^{40}$, wires 134 and 135, contact 34—35 of circuit controller $S^2$, wires 145 and 69, winding 24 of valve $V^3$, and line wire 59 back to battery B. Valve $V^3$ therefore becomes energized and vents the right hand end of cylinder 4 to atmosphere until the pressure has decreased below 50 pounds per square inch. Under these conditions, therefore, piston 5 is urged toward the left by a pressure of between 40 and 50 pounds per square inch.

If lever L is moved to its $p^3$ position when the braking apparatus is in its ineffective position, a circuit is completed for valve $V^4$ at contact 46—50 of lever L, and current flows from battery B through wire 55, contact 46—50 of lever L, line wire $76^a$, contact 83—84 of circuit controller $S^6$, wires 87, $72^a$, 67 and 58, winding 24 of valve $V^4$, and line wire 59 back to battery B. Valve $V^4$ therefore becomes energized and admits fluid to the right hand end of cylinder 4, so that piston 5 moves toward the left. When contact 32—33 of circuit controller $S^1$ becomes closed, the circuit previously described for valve $V^1$ becomes closed, and valve $V^1$ becomes energized, so that piston 6 is held in its projected position by fluid at full line pressure. As pointed out hereinbefore, contact 83—84 of circuit controller $S^6$ remains closed until piston 5 moves past the position at which it engages the auxiliary piston 6 when this piston occupies its projected position, and it will be apparent, therefore, that under the conditions now being described, valve $V^4$ remains energized so that piston 6 is held in its projected position, and piston 5 is held against piston 6, by full line pressure.

If lever L is moved to its $p^4$ position when the braking apparatus is in its ineffective position, a circuit is completed for valve $V^4$ which is similar to the circuit which is completed for valve $V^4$ when lever L is moved to its $p^3$ position, except that the circuit now includes contact 46—51 of lever L and wire 82, instead of contact 46—50 of lever L. Piston 5 is therefore moved toward the left by fluid at full line pressure. Furthermore, as soon as contact 32—33 of circuit controller $S^1$ becomes closed, a circuit is also completed for valve $V^2$ and current flows from battery C through line wire 59, wire 133, contact 32—33 of circuit controller $S^1$, wire 132, winding 24 of valve $V^2$, wire 144, asymmetric unit 143 in its low resistance direction, wire 142, line wire $71^b$, wire 115, contact $46^a$—$53^a$ of lever L, and wire 101 back to battery C. Valve $V^2$ therefore becomes energized and vents the left hand end of cylinder 4 to atmosphere, so that the pistons 5 and 6 move to their extreme left hand positions. When piston 5 reaches its extreme left hand position, contact 83—84 of circuit controller $S^6$ opens, and contact 83—85 becomes closed. When contact 83—84 opens, the circuit for valve $V^4$ is interrupted, and valve $V^4$ becomes deenergized. When contact 83—85 becomes closed, if the pressure in the right hand end of cylinder 4 is then below 70 pounds per square inch, a branch is completed for the circuit just traced for valve $V^4$ which branch passes from line wire $76^b$ through contact 83—85 of circuit controller $S^6$, wire 119, contact 45—$45^a$ of pressure responsive device $P^{70}$ and wire 66 to wire 67. Valve $V^4$ then again becomes energized and admits fluid pressure to the right hand end of cylinder 4 until the pressure in this end of the cylinder exceeds 70 pounds per square inch. If the pressure in the right hand end of cylinder 4 exceeds 80 pounds per square inch when contact 83—85 of circuit controller $S^6$ is closed, a circuit is completed for valve $V^3$, and current flows from battery B through wire 55, contact 46—51 of lever L, wire 82, line wire $76^a$, contact 83—85 of circuit controller S⁶, wire 119, contact 45—45ᵇ of pressure responsive device P⁷⁰, wires 75, 134 and 135, contact 34—35 of circuit controller S², wires 145 and 69, winding 24 of valve V³, and line wire 59 back to battery B. Under these conditions, valve V³ becomes energized and vents the left hand end of cylinder 4 to atmosphere until the pressure in this end of the cylinder is again below 80 pounds per square inch. It will be apparent, therefore, that with the apparatus constructed in the manner here shown, when lever L is moved to its $p^4$ position, piston 5 is held in its extreme left hand position by fluid at a pressure of between 70 and 80 pounds per square inch.

If, when the braking apparatus is in its effective position, the operator desires to restore it to its ineffective position, he moves lever L to its $p^5$ or "off" position. Under these conditions, the circuit previously traced for valve V¹ becomes closed at contact 46ᵃ—54ᵃ of lever L, and valve V¹ becomes energized so that piston 6 is moved to its projected position by fluid at full line pressure. A circuit is also completed for valve V³ at contact 46ᵃ—47ᵃ of lever L, and current flows from battery C, through line wire 59, winding 24 of valve V³, wire 69, contact 36—37 of circuit controller S³, asymmetric unit 137 in its low resistance direction, line wire 56ᵇ, wire 123, contact 46ᵃ—47ᵃ of lever L, and wire 101 back to battery C. Valve V³ therefore becomes energized, so that fluid is exhausted from the right hand end of cylinder 4. Furthermore, a circuit is completed for valve V² which is similar to the circuit which was previously closed for this valve at contact 46ᵃ—53ᵃ of lever L when lever L occupied its $p^4$ position, except that this circuit now includes contact 46ᵃ—52ᵃ of lever L instead of contact 46ᵃ—53ᵃ. Valve V² therefore also becomes energized, so that fluid pressure is admitted to the region of cylinder 4 between the pistons 5 and 6. This pressure moves piston 5 to its extreme right hand position, thereby restoring the braking apparatus to its ineffective position. When the piston reaches its extreme right hand position, contact 32—33 of circuit controller S¹ and contact 34—35 of circuit controller S² are opened, and the valves V¹, V² and V³ therefore become deenergized. The apparatus is then restored to the condition in which it is illustrated in the drawings.

It should be noted that with the apparatus constructed in the manner here shown, the asymmetric unit 143 prevents valve V² from becoming energized by current supplied to line wire 76ᵃ from battery B for operating valve V⁴. Likewise the asymmetric unit 137 prevents valve V³ from becoming energized by current supplied to line wire 56ᵃ from battery B for operating valve V⁴. Furthermore, the asymmetric units 139 and 110 prevent valve V⁴ from becoming energized when lever L occupies its $p^5$ position.

Although I have herein shown and described only a few forms of railway braking apparatus embodying my invention, it is understood that various changes and modifications may be made therein within the scope of the appended claims without departing from the spirit and scope of my invention.

Having thus described my invention, what I claim is:

1. In combination, a railway braking bar located in the trackway, a cylinder, a first piston movable in said cylinder between one end of the cylinder and an intermediate point in the cylinder, a second piston operatively connected with said braking bar and movable in said cylinder between the other end of the cylinder and said first piston, a first valve for controlling the admission of fluid pressure to the region between said first piston and said one end of the cylinder, a second valve, means controlled jointly by said first and second valves for at times admitting fluid pressure to the region between said pistons, a third valve for controlling the admission of fluid pressure to the region between said second piston and said other end of the cylinder, a manually controlled device for selectively controlling said three valves, and a fourth valve controlled by said device for controlling the exhaust of fluid pressure from selected regions of said cylinder depending upon the condition of at least one of said first three valves.

2. In combination, a railway braking bar located in the trackway, a cylinder, a first piston movable in said cylinder between one end of the cylinder and an intermediate point in the cylinder, a second piston operatively connected with said braking bar and movable in said cylinder between the other end of the cylinder and said first piston, manually controlled apparatus for admitting fluid pressure selectively to the regions between said pistons and between each piston and the adjacent end of the cylinder, and a single manually controlled exhaust valve for connecting selected ones of said regions with atmosphere in accordance with the condition of said apparatus.

3. In combination, a railway braking bar located in the trackway, a cylinder, a first piston movable in said cylinder between one end of the cylinder and an intermediate point in the cylinder, a second piston operatively connected with said braking bar and movable in said cylinder between the other end of the cylinder and said first piston, manually controlled apparatus for admitting fluid pressure selectively to the regions between said pistons and between each piston and the adjacent end of the cylinder, a single manually controlled exhaust valve, and means including said valve for connecting selected ones of said regions with atmosphere in accordance with the condition of said apparatus and in accordance with the position of said second piston.

4. In combination, a railway braking bar located in the trackway, a cylinder, a first piston movable in said cylinder between one end of the cylinder and an intermediate point in the cylinder, a second piston operatively connected with said braking bar and movable in said cylinder between the other end of the cylinder and said first piston, manually controlled apparatus for admitting fluid pressure selectively to the regions between said pistons and between each piston and the adjacent end of the cylinder, a single manually controlled exhaust valve, and means including said valve for connecting selected ones of said regions with atmosphere in accordance with the condition of said apparatus and in accordance with the position of said second piston and the pressure between said second piston and said other end of the cylinder.

5. In combination, a railway braking bar located in the trackway, a cylinder, a first piston operatively connected with said braking bar, means for moving said piston in one direction to urge said braking bar toward its braking position, a second piston in said cylinder, and means controlled in part by the position of said first piston for driving said second piston in the opposite direction to limit the stroke of said first piston.

6. In combination, a railway braking bar located in the trackway, a cylinder, a first piston movable in said cylinder between one end of the cylinder and an intermediate point in the cylinder, a second piston operatively connected with said braking bar and movable in said cylinder between the other end of the cylinder and said first piston, manually controlled apparatus for selectively connecting the region between said pistons and the region between said first piston and said one end of the cylinder with a source of fluid pressure, and means controlled in part by the pressure between said pistons for supplying fluid pressure to the region between said first piston and said one end of the cylinder.

7. In combination, a railway braking bar located in the trackway, a cylinder, a first piston movable in said cylinder between one end of the cylinder and an intermediate point, in the cylinder, a second piston operatively connected with said braking bar and movable in said cylinder between the other end of the cylinder and said first piston, manually controlled apparatus for selectively connecting the region between said pistons and the region between said first piston and said one end of the cylinder with a source of fluid pressure, and manually controlled means responsive to the pressure between said pistons and to the position of said second piston for supplying fluid pressure to the region between said first piston and said one end of the cylinder.

8. In combination, a railway braking bar located in the trackway, a cylinder, a first piston movable in said cylinder between one end of the cylinder and an intermediate point in the cylinder, a second piston operatively connected with said braking bar and movable in said cylinder between the other end of the cylinder and said first piston, means for selectively supplying fluid pressure to the regions between each said piston and the adjacent end of the cylinder, and manually controlled means for at times connecting the region between said first piston and said other end of the cylinder with the region between said pistons.

9. In combination, a railway braking bar located in the trackway, a cylinder, a first piston movable in said cylinder between one end of the cylinder and an intermediate point in the cylinder, a second piston operatively connected with said braking bar and movable in said cylinder between the other end of the cylinder and said first piston, means for at times supplying fluid pressure to the region between said second piston and the adjacent end of the cylinder to move said braking bar to its braking position, means responsive to the position of said second piston for moving said first piston toward said intermediate position to limit the stroke of said second piston, and means effective when said braking bar is in its braking position for regulating the pressure in the region between said second piston and the adjacent end of the cylinder to a predetermined value.

10. In combination, a railway braking bar located in the trackway, a cylinder, a first piston movable in said cylinder between one end of the cylinder and an intermediate point in the cylinder, a second piston operatively connected with said braking bar and movable in said cylinder between the other end of the cylinder and said first piston, means for at times supplying fluid pressure to the region between said second piston and the adjacent end of the cylinder to move said braking bar to its braking position, means responsive to the position of said second piston for moving said first piston toward said intermediate position to limit the stroke of said second piston, and means effective when said braking bar is in its braking position for connecting the region between said second piston and the adjacent end of the cylinder with atmosphere if the pressure in this region exceeds a predetermined value.

11. In combination, a railway braking bar located in the trackway, a cylinder, a first piston movable in said cylinder between one end of the cylinder and an intermediate point in the cylinder, a second piston operatively connected with said braking bar and movable in said cylinder between the other end of the cylinder and said first piston, manually controlled means for at times connecting the region between said second piston and the adjacent end of the cylinder with a source of fluid pressure to move said second piston in one direction for urging said braking bar toward its braking position, means effective when said second piston is moved in said one direction for at times supplying fluid pressure to the region between said first piston and the adjacent end of the cylinder to move said first piston toward said intermediate position for limiting the stroke of said second piston, and means effective when said braking bar is in its braking position for regulating the pressure in the region between said second piston and the adjacent end of the cylinder within predetermined limits.

12. In combination, a railway braking bar located in the trackway, a cylinder, a first piston movable in said cylinder between one end of the cylinder and an intermediate point in the cylinder, a second piston operatively connected with said braking bar and movable in said cylinder between the other end of the cylinder and said first piston, manually controlled means for at times connecting the region between said second piston and the adjacent end of the cylinder with a source of fluid pressure to move said second piston in one direction for urging said braking bar toward its braking position, means responsive to the position of said second piston for connecting the region between said first piston and the adjacent end of the cylinder with a source of fluid pressure to move said first piston toward said intermediate position for limiting the stroke of said second piston, and means effective when said braking bar is in its braking position for disconnecting the region between said second piston and the adjacent end of the cylinder from the source of fluid pressure if the pressure in said regions exceeds a predetermined value and for subsequently again connecting it with the source if the pressure decreases below a predetermined value.

13. In combination, a railway braking bar located in the trackway, a cylinder, a first piston movable in said cylinder between one end of the cylinder and an intermediate point in the cylinder, a second piston operatively connected with said braking bar and movable in said cylinder between the other end of the cylinder and said first piston, a first winding for controlling the admission of fluid pressure to the region between said first piston and said one end of the cylinder, a second winding, means controlled jointly by said first and second windings for at times admitting fluid pressure to the region between said pistons, a third winding for controlling the admission of fluid pressure to the region between said second piston and said other end of the cylinder, a manually controlled device for selectively controlling said three windings, and a fourth winding controlled by said device for controlling the exhaust of fluid pressure from selected regions of said cylinder depending upon the condition of said first three windings.

14. In combination, a railway braking bar located in the trackway, a cylinder, a first piston movable in said cylinder between one end of the cylinder and an intermediate point in the cylinder, a second piston operatively connected with said braking bar and movable in said cylinder between the other end of the cylinder and said first piston, a first magnet valve arranged when energized to admit fluid pressure to said cylinder between said first piston and the adjacent end of the cylinder, a second magnet valve, means effective when said first and second magnet valves are both energized for at other times admitting fluid pressure to said cylinder between said first and second pistons, a third magnet valve arranged when energized to admit fluid pressure to said cylinder between said second piston and the adjacent end of the cylinder; a fourth magnet valve arranged to exhaust fluid from said cylinder between said pistons, or between said first piston and the adjacent end of the cylinder, or between said second piston and the adjacent end of the cylinder according as said fourth valve is deenergized, or as said second valve is energized when said fourth valve is deenergized, or as said fourth valve is energized; and manually controlled means responsive to the pressure in said cylinder between said pistons and between said second piston and the adjacent end of the cylinder and to the position of said second piston for selectively energizing said valves.

15. In combination, a railway braking bar located in the trackway, a cylinder, a first piston movable in said cylinder between one end of the cylinder and an intermediate point in the cylinder, a second piston operatively connected with said braking bar and movable in said cylinder between the other end of the cylinder and said first piston, a first magnet valve for at times admitting fluid pressure to said cylinder between said second piston and the adjacent end of the cylinder, a second magnet valve for at times admitting fluid pressure to said cylinder between said first piston and the adjacent end of the cylinder, a third magnet valve, means controlled by said second and third magnet valves for at times admitting fluid pressure to said cylinder between said pistons, a normally closed contact arranged to be opened if the pressure between said pistons exceeds a predetermined value, a normally open contact arranged to be closed upon a predetermined amount of movement of said second piston toward said first piston, a manually operable lever, a circuit for said second magnet valve controlled by said lever and including said normally closed and said normally open contacts, and circuits for said first and said third valves controlled by said lever.

16. In combination, a railway braking bar located in the trackway, a cylinder, a first piston movable in said cylinder between one end of the cylinder and an intermediate point in the cylinder, a second piston operatively connected with said braking bar and movable in said cylinder between the other end of the cylinder and said first piston, a first magnet valve arranged when energized to admit fluid pressure to said cylinder between said first piston and the adjacent end of the cylinder, a second magnet valve, means effective when said first and second magnet valves are both energized for at other times admitting fluid pressure to said cylinder between said first and second pistons, a third magnet valve arranged when energized to admit fluid pressure to said cylinder between said second piston and the adjacent end of the cylinder, a fourth magent valve, means for exhausting fluid pressure from said cylinder between said pistons when said fourth valve is deenergized, means for exhausting fluid pressure from said cylinder between said first piston and the adjacent end of the cylinder when said second valve is energized and said fourth valve is deenergized, means for exhausting fluid pressure from said cylinder between said second piston and the adjacent end of the cylinder when said fourth valve is energized, and manually controlled means responsive to the pressure in said cylinder between said first and second pistons and between said second piston and the adjacent end of the cylinder and to the position of said second piston for selectively energizing said valves.

17. In combination, a railway braking bar located in the trackway, a cylinder, a first piston reciprocable in said cylinder between one end of the cylinder and an intermediate point in the cylinder, a second piston operatively connected with said braking bar and movable in said cylinder between the other end of the cylinder and said first piston, a first valve for controlling the admission of fluid pressure to said cylinder between said second piston and the adjacent end of the cylinder, a first, a second, and a third contact, means for operating either said first and second contacts or said third contact, a fourth contact responsive to the pressure in said cylinder between said second piston and the adjacent end of the cylinder, means including said first contact and said fourth contact for at times controlling said first valve, means including said third contact for at other times controlling said first valve, a fifth normally open contact arranged to be closed upon a predetermined amount of movement of said second piston toward said first piston, a second valve for controlling the admission of fluid pressure to said cylinder between said first piston and the adjacent end of the cylinder, and means including said second contacts and said first contact for at times controlling said second valve.

18. In combination, a railway braking bar located in the trackway, a cylinder, a first piston reciprocable in said cylinder between one end of the cylinder and an intermediate point in the cylinder, a second piston operatively connected with said braking bar and movable in said cylinder between the other end of the cylinder and said first piston, a first winding for controlling the admission of fluid pressure to said cylinder between said first piston and the adjacent end of the cylinder, a second winding for controlling the admission of fluid pressure to said cylinder between said pistons, a third winding for controlling the admission of fluid pressure to said cylinder between said second piston and the adjacent end of the cylinder, a fourth winding for controlling the exhaust of fluid from the regions of said cylinder between said pistons and between said second piston and the adjacent end of the cylinder, a first, a second, and a third contact controlled in accordance with the position of said second piston, a fourth contact responsive to the pressure in said cylinder between said second piston and the adjacent end of the cylinder, a fifth, a sixth, and a seventh contact, manually controlled means for operating either said fifth and sixth contact or said seventh contact, means controlled by said first contact and said fifth contact for supplying current to said first winding, means controlled by said second contact for supplying current to said second winding, means controlled by said third contact for supplying current to said fourth winding, means controlled by said sixth contact and said fourth contact for supplying current to said third winding independently of the position of said second piston, and means controlled by said seventh contact for supplying current to said third winding independently of the position of said second piston and of the pressure in said cylinder between said second piston and the adjacent end of the cylinder.

19. In combination, a railway braking bar located in the trackway, a cylinder, a first piston reciprocable in said cylinder between one end of the cylinder and an intermediate point in the cylinder, a second piston operatively connected with said first piston and movable in said cylinder between the other end of the cylinder and said first piston, a first winding for controlling the admission of fluid pressure to said cylinder between said first piston and the adjacent end of the cylinder, a second winding for controlling the admission of fluid pressure to said cylinder between said pistons, a third winding for controlling the admission of fluid pressure to said cylinder between said second piston and the adjacent end of the cylinder, a fourth winding for controlling the exhaust of fluid pressure from the regions of said cylinder between said pistons and between said second piston and the adjacent end of the cylinder; a first, a second, a third, a fourth, a fifth, a sixth, and a seventh wire; a first, a second, a third, a fourth, and a fifth contact controlled in accordance with the position of said second piston; a sixth contact responsive to the pressure in said cylinder between said second piston and the adjacent end of the cylinder; a seventh, an eighth, a ninth, and a tenth contact; manually controlled means for operating said seventh and said eighth contact, said seventh and said ninth contact, or said tenth contact; a circuit for said first winding including said first contact, said seventh contact, and said first and said second wires; a circuit for said second winding including said second contact and said first and said third wires; a circuit for said fourth winding including said third contact and said first and said fourth wires; a first circuit for said third winding including said fourth contact and said first and said fifth wires; a second circuit for said third winding including said sixth contact, said first and sixth wires, and said eighth contact; a third circuit for said third winding including said sixth contact, said first and said sixth wires and said ninth contact; and a fourth circuit for said third winding including said tenth contact, said fifth contact, and said first and said seventh wires; said second and third circuits for said third winding being controlled independently of the position of said second piston.

20. In combination, a railway braking bar located in the trackway, a cylinder, a first piston reciprocable in said cylinder between one end of the cylinder and an intermediate point in the cylinder, a second piston operatively connected with said first piston and movable in said cylinder between the other end of the cylinder and said first piston, a first winding for controlling the admission of fluid pressure to said cylinder between said first piston and the adjacent end of the cylinder, a second winding for controlling the admission of fluid pressure to said cylinder between said pistons, a third winding for controlling the admission of fluid pressure to said cylinder between said second piston and the adjacent end of the cylinder, a fourth winding for controlling the exhaust of fluid pressure from the regions of said cylinder between said pistons and between said second piston and the adjacent end of the cylinder, a first, a second, a third, a fourth, a fifth, a sixth, a seventh, and an eighth wire, means for selectively connecting a source of current between said first wire and each of the remaining wires, a first, a second, a third, a fourth, a fifth, and a sixth contact controlled in accordance with the position of said second piston; means for connecting said third winding across said first and second wires, means including said first contact for connecting said first winding across said first and third wires, means including said second contact for connecting said second winding across said first and fourth wires, means including said third contact for connecting said fourth winding across said first and fifth wires, means including said fourth contact for connecting said third winding across said first and sixth wires, means including said fifth contact for connecting said third winding across said first and seventh wires, and means including said sixth contact for connecting said third winding across said first and eighth wires.

21. In combination, a railway braking bar located in the trackway, a cylinder, a first piston reciprocable in said cylinder between one end of the cylinder and an intermediate point in the cylinder, a second piston operatively connected with said first piston and movable in said cylinder between the other end of the cylinder and said first piston, a first winding for controlling the admission of fluid pressure to said cylinder between said first piston and the adjacent end of the cylinder, a second winding for controlling the admission of fluid pressure to said cylinder between said pistons, a third winding for controlling the admission of fluid pressure to said cylinder between said second piston and the adjacent end of the cylinder, a fourth winding for controlling the exhaust of fluid pressure from the regions of said cylinder between said pistons and between said second piston and the adjacent end of the cylinder, a first, a second, a third, and a fourth wire, means for connecting a source of electromotive force between said first wire and each of the remaining wires, a first contact responsive to the position of said second piston, a second contact responsive to the pressure in said cylinder between said second piston and the adjacent end of the cylinder, means including said first contact and a first asymmetric unit for connecting said second winding across said first and said second wires; means including said first contact and a second asymmetric unit for connecting said fourth winding across said first and said second wires, means for constantly connecting said second winding across said first and said third wires, means for at times supplying current to said first winding, and means including said second contact for at other times connecting said third winding across said first and said fourth wires independently of the position of said second piston.

22. In combination, a railway braking bar located in the trackway, a cylinder, a first piston reciprocable in said cylinder between one end of the cylinder and an intermediate point in the cylinder, a second piston operatively connected with said first piston and movable in said cylinder between the other end of the cylinder and said first piston, a first winding for controlling the admission of fluid pressure to said cylinder between said first piston and the adjacent end of the cylinder, a second winding for controlling the admission of fluid pressure to said cylinder between said pistons, a third winding for controlling the admission of fluid pressure to said cylinder between said second piston and the adjacent end of the cylinder, a fourth winding for controlling the exhaust of fluid pressure from the regions of said cylinder between said pistons and between said second piston and the adjacent end of the cylinder, a first, a second and a third wire, means for supplying current to said first and second or said first and third wires, a first, a second, a third, a fourth, and a fifth contact controlled in accordance with the position of said second piston, a sixth and a seventh contact responsive to the pressure in said cylinder between said second piston and the adjacent end of the cylinder, four asymmetric units, means including a first one of said asymmetric units for connecting said second winding across said first and said second wires, means including a second one of said asymmetric units for connecting said third winding across said first and second wires, means including a third one of said asymmetric units and said first contact for connecting said second winding across said first and said third wires, means including the remaining asymmetric unit and said first contact for connecting said fourth winding across said first and said third wires, means including said second contact for at times supplying such first winding with current, means including said third contact and said sixth contact for at times supplying said third winding with current, means including said fourth contact and said seventh contact for at other times supplying said third winding with current, and means including said fifth contact and said seventh contact for at still other times supplying said third winding with current.

23. In combination, a railway braking bar located in the trackway, a cylinder, a first piston reciprocable in said cylinder between one end of the cylinder and an intermediate point in the cylinder, a second piston operatively connected with said first piston and movable in said cylinder between the other end of the cylinder and said first piston, a first winding for controlling the admission of fluid pressure to said cylinder between said first piston and the adjacent end of the cylinder, a second winding for controlling the admission of fluid pressure to said cylinder between said pistons, a third winding for controlling the admission of fluid pressure to said cylinder between said second piston and the adjacent end of the cylinder, a fourth winding for controlling the exhaust of fluid pressure from the regions of said cylinder between said pistons and between said second piston and the adjacent end of the cylinder, a first, a second, a third, and a fourth wire; means for connecting a source of electromotive force with said first and said second, or said first and said third, or said first and said fourth wires; a first contact controlled in accordance with the position of said second piston, a second contact responsive to the pressure in said cylinder between said second piston and the adjacent end of the cylinder, four asymmetric units, means including a first one of said asymmetric units for connecting said second winding between said first and said second wires, means including a second one of said asymmetric units for connecting said third winding between said first and said second wires, means including a third one of said asymmetric units and said first contact for connecting said second winding across said first and said third wires, means including the remaining asymmetric unit and said first contact for connecting said fourth winding across said first and said third wires, means including said second contact only for connecting said third winding across said first and fourth wires, and means for at times supplying current to said first winding.

24. In combination, a railway braking bar located in the trackway, a cylinder, a first piston reciprocable in said cylinder between one end of the cylinder and an intermediate point in the cylinder, a second piston operatively connected with said first piston and movable in said cylinder between the other end of the cylinder and said first piston, a first winding for controlling the admission of fluid pressure to said cylinder between said first piston and the adjacent end of the cylinder, a second winding for controlling the admission of fluid pressure to said cylinder between said pistons, a third winding for controlling the admission of fluid pressure to said cylinder between said second piston and the adjacent end of the cylinder, a pair of wires, means for reversibly supplying current to said wires, a first and a second contact controlled in accordance with the position of said second piston, a first and a second asymmetric unit, means including said first contact and said first asymmetric unit for connecting said third winding across said wires, means including said second asymmetric unit and said second contact for connecting said second winding across said wires, means for at times supplying current to said first winding, a third contact responsive to the pressure in said cylinder between said second piston and the adjacent end of the cylinder, and means controlled by said third contact for at other times supplying current to said third winding independently of the position of said second piston.

25. In combination, a railway braking bar located in the trackway, a cylinder, a first piston reciprocable in said cylinder between one end of the cylinder and an intermediate point in the cylinder, a second piston operatively connected with said first piston and movable in said cylinder between the other end of the cylinder and said first piston, a first winding for controlling the admission of fluid pressure to said cylinder between said first piston and the adjacent end of the cylinder, a second winding for controlling the admission of fluid pressure to said cylinder between said pistons, a third winding for controlling the admission of fluid pressure to said cylinder between said second piston and the adjacent end of the cylinder, a first, a second, and a third wire, means for supplying current of one polarity or the other to either said first and said second or said first and said third wires, three contacts controlled in accordance with the position of said second piston, a first asymmetric unit, means including said first asymmetric unit and a first one of said contacts for connecting said first winding across said first and second wires, a second asymmetric unit, means including said second asymmetric unit for connecting said third winding across said first and said second wires, a third asymmetric unit, means including said third asymmetric unit and a second one of said contacts for connecting said second winding across said first and said third wires, a fourth asymmetric unit, means including said fourth asymmetric unit and a third one of said contacts for connecting said third winding across said first and said third wires, a fourth contact responsive to the pressure in said cylinder between said second piston and the adjacent end of the cylinder, and means controlled by said fourth contact for at times supplying said third winding with current independently of the position of said second piston.

26. In combination, a railway braking bar located in the trackway, a cylinder, a first piston reciprocable in said cylinder between one end of the cylinder and an intermediate point in the cylinder, a second piston operatively connected with said first piston and movable in said cylinder between the other end of the cylinder and said first piston, a first winding for controlling the admission of fluid pressure to said cylinder between said first piston and the adjacent end of the cylinder, a second winding for controlling the admission of fluid pressure to said cylinder between said pistons, a third winding for controlling the admission of fluid pressure to said cylinder between said second piston and the adjacent end of the cylinder, a fourth winding for controlling the exhaust of fluid pressure from the regions of said cylinder between said pistons and between said second piston and the adjacent end of the cylinder, a first, a second, a third, and a fourth wire, means for supplying current of one polarity or the other to said first and said second or said first and said third wires and of one polarity only to said first and said fourth wires, a plurality of contacts controlled in accordance with the position of said second piston, three contacts controlled in accordance with the position of said second piston, a first asymmetric unit, means including said first asymmetric unit and a first one of said contacts for connecting said first winding across first and second wires, a second asymmetric unit, means including said second asymmetric unit for connecting said third winding across said first and said second wires, a third asymmetric unit, means including said third asymmetric unit and a second one of said contacts for connecting said second winding across said first and said third wires, a fourth asymmetric unit, means including said fourth asymmetric unit and a third one of said contacts for connecting said third winding across said first and said third wires, means including a fourth one of said contacts for at times connecting said fourth winding across said first and fourth wires, means controlled by a fifth one of said contacts for at times supplying said third winding with current independently of the pressure in said cylinder between said second piston and the adjacent end of the cylinder, and means controlled by a sixth one of said contacts for at other times supplying said third winding with current independently of the pressure in said cylinder between said second piston and the adjacent end of the cylinder.

27. In combination, a railway braking bar located in the trackway, a cylinder, a first piston reciprocable in said cylinder between one end of the cylinder and an intermediate point in the cylinder, a second piston operatively connected with said first piston and movable in said cylinder between the other end of the cylinder and said first piston, a first winding for controlling the admission of fluid pressure to said cylinder between said first piston and the adjacent end of the cylinder, a second winding for controlling the admission of fluid pressure to said cylinder between said pistons, a third winding for controlling the admission of fluid pressure to said cylinder between said second piston and the adjacent end of the cylinder, a fourth winding for controlling the exhaust of fluid pressure from the regions of said cylinder between said pistons and between said second piston and the adjacent end of the cylinder, a first, a second, and a third wire, means for reversibly supplying current to either said first and said second or said first and said third wires, a first, a second, a third, a fourth, and a fifth contact controlled in accordance with the position of said second piston, a sixth, a seventh, and an eighth contact responsive to the pressure in said cylinder between said second piston and the adjacent end of the cylinder, four asymmetric units; means including a first one of said asymmetric units, said first contact, and said sixth contact for connecting said third winding across said first and said second wires; means including a second one of said asymmetric units, said second contact, and said seventh contact for connecting said third winding across said first and said third wires; means including said third contact and said eighth contact for at times supplying said third winding with current; means including said fourth contact, and said third asymmetric unit for connecting said fourth winding across said first and said second wires, means including said fifth contact and the remaining asymmetric unit for connecting said second winding across said first and said third wires, and means for at times supplying said first winding with current.

28. In combination, a railway braking bar located in the trackway, a cylinder, a first piston reciprocable in said cylinder between one end of the cylinder and an intermediate point in the cylinder, a second piston operatively connected with said first piston and movable in said cylinder between the other end of the cylinder and said first piston, a first winding for controlling the admission of fluid pressure to said cylinder between said first piston and the adjacent end of the cylinder, a second winding for controlling the admission of fluid pressure to said cylinder between said pistons, a third winding for controlling the admission of fluid pressure to said cylinder between said second piston and the adjacent end of the cylinder, a fourth winding for controlling the exhaust of fluid pressure from the regions of said cylinder between said pistons and between said second piston and the adjacent end of the cylinder, a first, a second, and a third wire, means for reversibly supplying current to either said first and said second or said first and said third wires, a first, a second, a third, a fourth, and a fifth contact controlled in accordance with the position of said second piston, a sixth, and a seventh contact responsive to the pressure in said cylinder between said second piston and the adjacent end of the cylinder, four asymmetric units; means including a first one of said asymmetric units, said first contact, and said sixth contact for connecting said third winding across said first and said second wires; means including a second one of said asymmetric units, said second contact, and said seventh contact for connecting said third winding across said first and said third wires, means including a third one of said asymmetric units and said third contact for connecting said fourth winding across said first and said second wires, means including the remaining asymmetric unit and said fourth contact for connecting said second winding across said first and said third wires, means for at times supplying current to said first winding, and means including said fifth contact and said seventh contact for at other times supplying current to said third winding.

29. In combination, a railway braking bar located in the trackway, a cylinder, a first piston reciprocable in said cylinder between one end of the cylinder and an intermediate point in the cylinder, a second piston operatively connected with said first piston and movable in said cylinder between the other end of the cylinder and said first piston, a first winding for controlling the admission of fluid pressure to said cylinder between said first piston and the adjacent end of the cylinder, a second winding for controlling the admission of fluid pressure to said cylinder between said pistons, a third winding for controlling the admission of fluid pressure to said cylinder between said second piston and the adjacent end of the cylinder, a fourth winding for controlling the exhaust of fluid pressure from the regions of said cylinder between said pistons and between said second piston and the adjacent end of the cylinder, a first, a second, a third, and a fourth wire; means for supplying current of one polarity or the other to said first and said second, or said first and said third, or said first and said fourth wires; a first, a second, a third, a fourth, and a fifth contact controlled in accordance with the position of said second piston, a sixth and a seventh contact responsive to the pressure in said cylinder between said second piston and the adjacent end of the cylinder, six asymmetric units, means including a first one of said asymmetric units for connecting said third winding across said first and said second wires, means including a second one of said asymmetric units and said first contact for connecting said first winding across said first and said second wires, means including a third one of said asymmetric units and said second contact for connecting said second winding across said first and said third wires; means including a fourth one of said asymmetric units and said third contact for connecting said fourth winding across said first and said fourth wires; means including a fifth one of said asymmetric units, said fourth contact, and said sixth contact for connecting said third winding across said first and said fourth wires; and means including the remaining asymmetric unit, said fifth contact, and said seventh contact for connecting said third winding across said first and said third wires.

30. In combination, a railway braking bar located in the trackway, a cylinder, a first piston reciprocable in said cylinder between one end of the cylinder and an intermediate point in the cylinder, a second piston operatively connected with said braking bar and movable in said cylinder between the other end of the cylinder and said first piston, a first winding for controlling the admission of fluid pressure to said cylinder between said first piston and the adjacent end of the cylinder, a second winding for controlling the admission of fluid pressure to said cylinder between said pistons, a third winding for controlling the admission of fluid pressure to said cylinder between said second piston and the adjacent end of the cylinder, a fourth winding for controlling the exhaust of fluid pressure from the regions of said cylinder between said second piston and the adjacent end of the cylinder, a first, a second, and a third line wire, means for supplying current of normal or reverse polarity to said first and said second line wires and to said first and said third line wires, four asymmetric units, a first, a second, a third, and a fourth contact controlled in accordance with the position of said second piston, means including a first one of said asymmetric units for connecting said second winding across said first and said second line wires, means including a second one of said asymmetric units and said first contact for connecting said third winding across said first and said second line wires, means including a third one of said asymmetric units and said second contact for connecting said fourth winding across said first and said third line wires, means including the fourth asymmetric unit and said third contact for connecting said third winding across said first and said third line wires, means including said fourth contact for at times energizing said first winding; and means including said fourth contact for at times energizing said second winding.

In testimony whereof I affix my signature.

HERBERT L. BONE.